United States Patent
Park et al.

(10) Patent No.: US 9,967,570 B2
(45) Date of Patent: May 8, 2018

(54) IMAGE CODING METHOD AND DEVICE FOR BUFFER MANAGEMENT OF DECODER, AND IMAGE DECODING METHOD AND DEVICE

(71) Applicant: SAMSUNG ELECTRONICS CO., LTD., Suwon-si (KR)

(72) Inventors: Young-o Park, Seoul (KR); Chan-yul Kim, Seongnam-si (KR); Kwang-pyo Choi, Anyang-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/676,155

(22) Filed: Aug. 14, 2017

(65) Prior Publication Data

US 2017/0347101 A1    Nov. 30, 2017

Related U.S. Application Data

(63) Continuation of application No. 15/492,123, filed on Apr. 20, 2017, which is a continuation of application
(Continued)

(30) Foreign Application Priority Data

Apr. 2, 2012  (KR) .................. 10-2012-0034093

(51) Int. Cl.
*H04N 19/00* (2014.01)
*H04N 19/152* (2014.01)
(Continued)

(52) U.S. Cl.
CPC .......... *H04N 19/152* (2014.11); *H04N 19/44* (2014.11); *H04N 19/70* (2014.11)

(58) Field of Classification Search
CPC ...................................................... H04N 19/70
(Continued)

(56) References Cited

U.S. PATENT DOCUMENTS 6,542,549 B1 *  4/2003  Tan .................. H04N 19/20
                                                      348/419.1
6,961,354 B2   11/2005  Watanabe et al.
(Continued)

FOREIGN PATENT DOCUMENTS

CN    1251004 A    4/2000
CN    1941905 A    4/2007
(Continued)

OTHER PUBLICATIONS

Communication dated Jul. 26, 2016, issued by the Japanese Intellectual Property Office in counterpart Japanese Application No. 2014-543421.
(Continued)

*Primary Examiner* — Jeffery Williams
(74) *Attorney, Agent, or Firm* — Sughrue Mion, PLLC

(57) ABSTRACT

Provided are methods and apparatuses for encoding and decoding an image. Method of encoding includes: determining a maximum size of a buffer to decode each image frame by a decoder, a number of image frames to be reordered, and latency information of an image frame having a largest difference between an encoding order and a display order from among image frames that form an image sequence, based on an encoding order the image frames that form the image sequence, an encoding order of reference frames referred to by the image frames, a display order of the image frames, and a display order of the reference frames; and adding, to a mandatory sequence parameter set, a first syntax indicating the maximum size of the buffer, a second syntax
(Continued)

indicating the number of image frames to be reordered, and a third syntax indicating the latency information.

1 Claim, 20 Drawing Sheets

Related U.S. Application Data

No. 15/386,625, filed on Dec. 21, 2016, now Pat. No. 9,699,471, which is a continuation of application No. 15/221,652, filed on Jul. 28, 2016, now Pat. No. 9,560,370, which is a continuation of application No. 14/287,685, filed on May 27, 2014, now Pat. No. 9,438,901, which is a continuation of application No. PCT/KR2012/009972, filed on Nov. 23, 2012.

(60) Provisional application No. 61/563,678, filed on Nov. 25, 2011.

(51) Int. Cl.
*H04N 19/44* (2014.01)
*H04N 19/70* (2014.01)

(58) Field of Classification Search
USPC .................................................. 375/240.26
See application file for complete search history.

(56) References Cited

U.S. PATENT DOCUMENTS

| | | | |
|---|---|---|---|
| 8,107,744 B2 | 1/2012 | Tian et al. | |
| 8,335,265 B2 | 12/2012 | Hannuksela et al. | |
| 8,571,115 B2 | 10/2013 | Suzuki | |
| 8,649,434 B2 | 2/2014 | Takahashi et al. | |
| 8,670,486 B2 | 3/2014 | Hannuksela | |
| 9,332,254 B2 | 5/2016 | Wang et al. | |
| 2005/0074061 A1 | 4/2005 | Ribas-Corbera et al. | |
| 2007/0086521 A1 | 4/2007 | Wang et al. | |
| 2007/0127578 A1 | 6/2007 | Wu et al. | |
| 2008/0002773 A1 | 1/2008 | Lai | |
| 2010/0195738 A1 | 8/2010 | Zhu | |

FOREIGN PATENT DOCUMENTS

| | | | |
|---|---|---|---|
| CN | 101300851 A | 11/2008 | |
| EP | 2209319 A2 | 7/2010 | |
| JP | 2006-519517 A | 8/2006 | |
| JP | 2008536420 A | 9/2008 | |
| JP | 2009512306 A | 3/2009 | |
| JP | 2009-124748 A | 6/2009 | |
| JP | 2010541471 A | 12/2010 | |
| JP | 201182683 A | 4/2011 | |
| KR | 10-2004-0106403 A | 12/2004 | |
| KR | 10-0769234 B1 | 10/2007 | |
| KR | 10-0837322 B1 | 6/2008 | |
| WO | 2008130500 A2 | 10/2008 | |

OTHER PUBLICATIONS

Communication dated Sep. 29, 2016, issued by the State Intellectual Property Office of P.R. China in counterpart Chinese Application No. 201280068213.7.
Sullivan, G., "Syntax to express a constraint on reordering latency", MPEG Meeting (Motion picture expert group or ISO/IEC JTC1/SC29/WG11), Jul. 18, 2011-Jul. 22, 2011, Torino, Italy, 5 pages total, XP030049537.
Sullivan, G., "Proposed constraint on reordering latency (for further consideration of JCTVC-F541)", Joint Collaborative Team on Video Coding (JCT-VC), 7th meeting, Nov. 21, 2011-Nov. 30, 2011, Geneva, Switzerland, 5 pages total, XP030110763.
Communication issued Sep. 16, 2015, issued by the European Patent Office in counterpart European Patent Application No. 12850941.1.
International Search Report for PCT/KR2012/009972 dated Feb. 28, 2013 [PCT/ISA/210].
Written Opinion for PCT/KR2012/009972 dated Feb. 28, 2013 [PCT/ISA/237].
Notification of Transmittal of International Search Report and Written Opinion for PCT/KR2012/009972 dated Feb. 28, 2013 [PCT/ISA/220].
Communication dated Oct. 24, 2017, from the Intellectual Property Office of Taiwan in counterpart application No. 106113476.
Hendry et al., "AHG21: Explicit Reference Pictures Signaling with Output Latency Count Scheme" Joint Collaborative Team on Video Coding (JCT-VC) of ITU-T SG16 WP3 and ISO/IEC JTC1/SC29/WG11, 7th Meeting: Geneva, CH, Nov. 21-30, 2011 Document: JCTVC-G166, (3 Pages Total).

* cited by examiner

CODING UNIT (1010)

PREDICTION UNIT (1060)

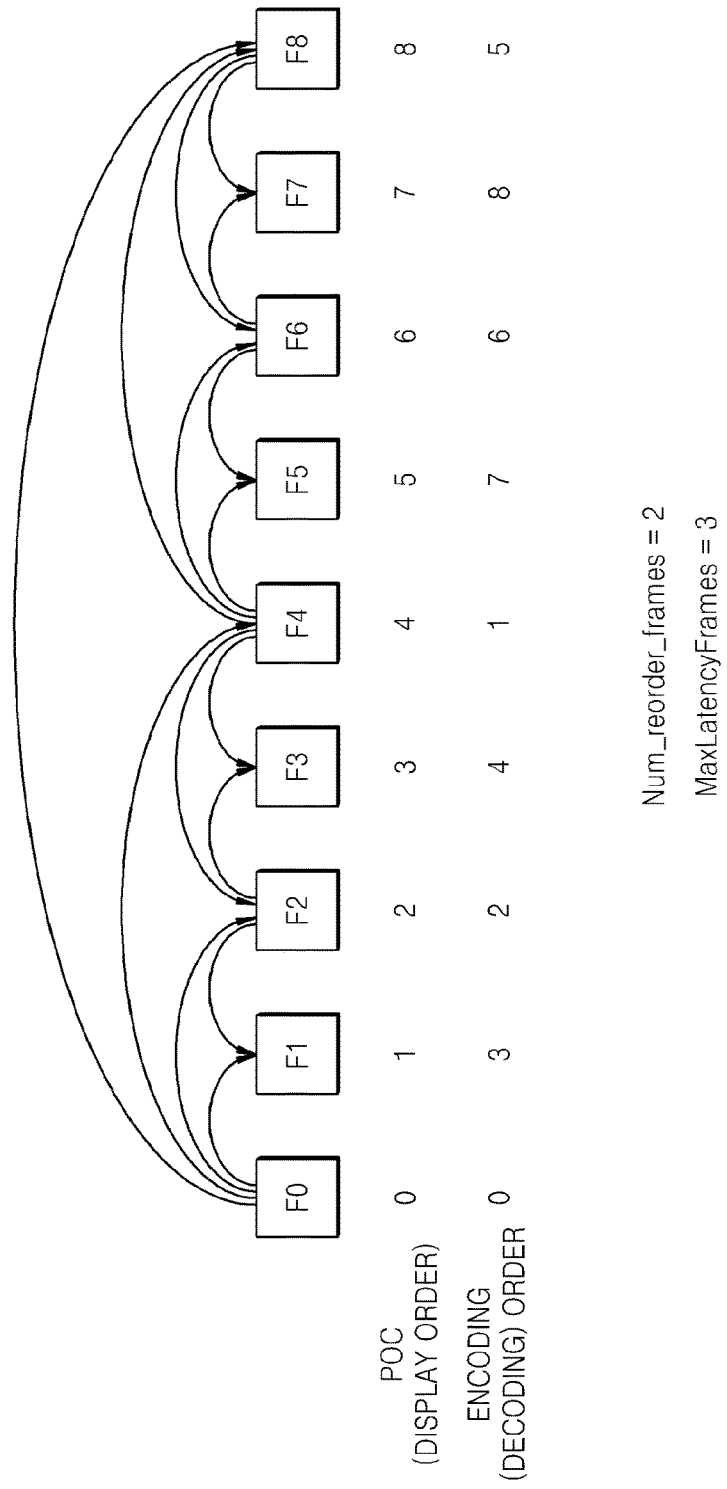

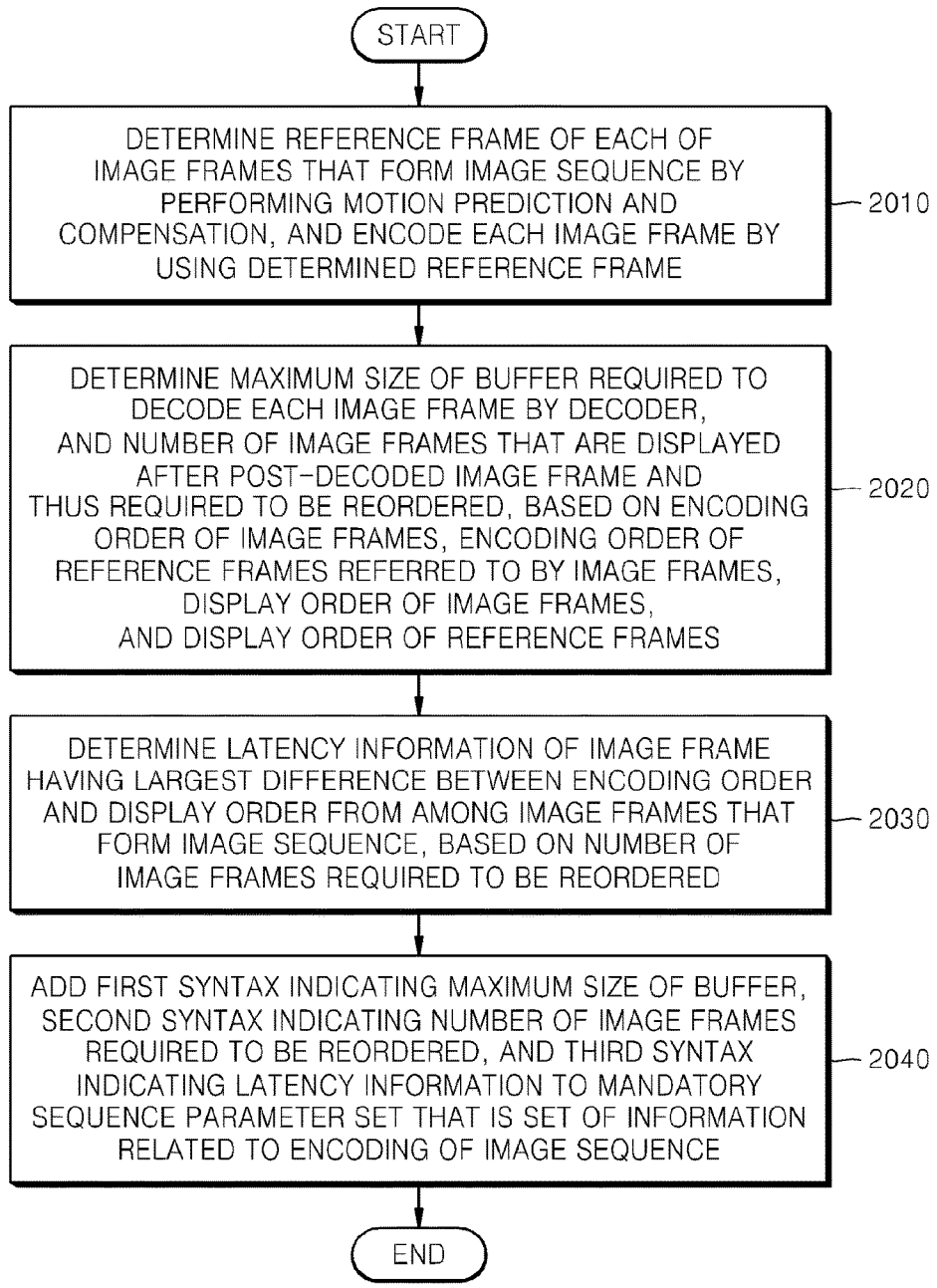

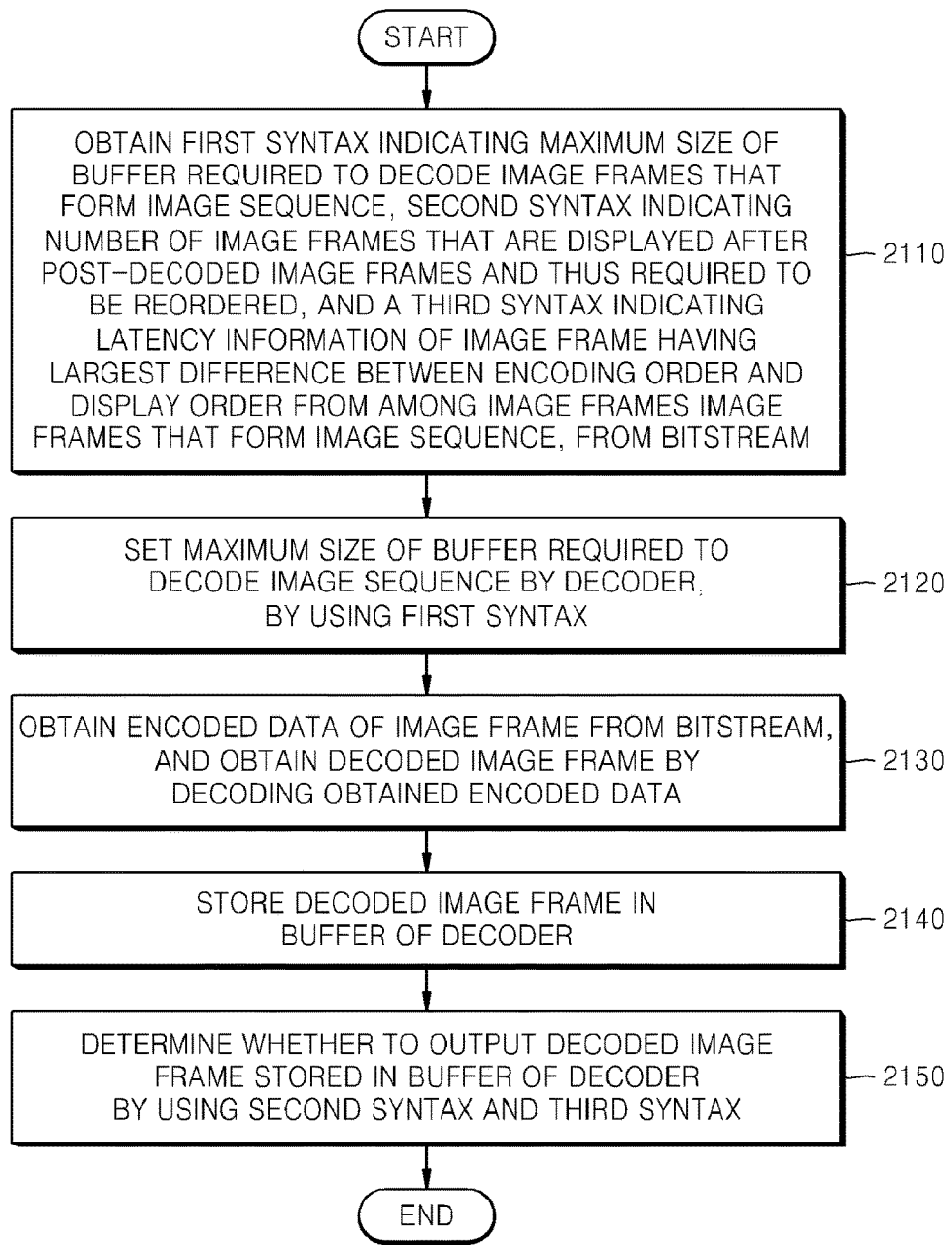

IMAGE CODING METHOD AND DEVICE FOR BUFFER MANAGEMENT OF DECODER, AND IMAGE DECODING METHOD AND DEVICE

CROSS-REFERENCE TO RELATED APPLICATIONS

This is a continuation of U.S. application Ser. No. 15/492,123, filed on Apr. 20, 2017, which is a continuation of U.S. application Ser. No. 15/386,625, filed on Dec. 21, 2016, now U.S. Pat. No. 9,699,471, issued Jul. 4, 2017, which is a continuation of U.S. application Ser. No. 15/221,652, filed on Jul. 28, 2016, now U.S. Pat. No. 9,560,370, issued Jan. 31, 2017, which is a continuation of U.S. application Ser. No. 14/287,685 filed on May 27, 2014, now U.S. Pat. No. 9,438,901, issued Sep. 6, 2016, which is a continuation of PCT/KR2012/009972, filed on Nov. 23, 2012, which claims priority from Korean Patent Application No. 10-2012-0034093, filed on Apr. 2, 2012 in the Korean Intellectual Property Office (KIPO), and claims the benefit of U.S. Provisional Application No. 61/563,678, filed on Nov. 25, 2011. The entire disclosures of the prior applications are considered part of the disclosure of the accompanying continuation application, and are hereby incorporated by reference.

BACKGROUND

1. Field

Methods and apparatuses consistent with exemplary embodiments relate to encoding and decoding an image, and more particularly, to efficiently encoding and decoding information for controlling and managing a decoded picture buffer (DPB) storing a decoded picture.

2. Description of the Related Art

In a video codec, such as ITU-T H.261, ISO/IEC MPEG-1 visual, ITU-T H.262 (ISO/IEC MPEG-2 visual), ITU-T H.264, ISO/IEC MPEG-4 visual, or ITU-T H.264 (ISO/IEC MPEG-4 AVC), a macroblock is predictive encoded via inter prediction or intra prediction, and a bitstream is generated from encoded image data according to a predetermined format defined by each video codec and is output.

SUMMARY

Aspects of one or more exemplary embodiments provide a method and apparatus for encoding an image, wherein information for controlling and managing a buffer of a decoder is efficiently encoded, and a method and apparatus for decoding an image, wherein a buffer is efficiently managed by using information for controlling and managing the buffer.

According to an aspect of an exemplary embodiment, information about buffer size, which is used to decode pictures included in a video sequence, is mandatorily included in a bitstream and transmitted, and a decoder can decode a picture by assigning a buffer size based on the information.

Also, according to an aspect of an exemplary embodiment, information used to determine when to output picture stored in the buffer is mandatorily included in the bitstream and transmitted.

According to aspects of one or more exemplary embodiments, system resources of a decoder can be prevented from being wasted because buffer size information to decode pictures included in an image sequence is mandatorily added to and transmitted with a bitstream, and the decoder uses the buffer size information to perform decoding by assigning a buffer size as required. Also, according to one or more exemplary embodiments, information for determining an output time of a picture stored in a buffer is mandatorily added to and transmitted with a bitstream, and a decoder may pre-determine whether to output a pre-decoded image frame by using the information for determining an output time of a picture stored in the buffer to thereby prevent an output latency of a decoded image frame.

According to an aspect of an exemplary embodiment, there is provided a method of encoding an image, the method including: determining reference frames respectively of image frames that form an image sequence by performing motion prediction and compensation, and encoding the image frames by using the determined reference frames; determining a maximum size of a buffer to decode the encoded image frames by a decoder and a number of image frames to be reordered, based on an encoding order of the image frames, an encoding order of the reference frames referred to by the image frames, a display order of the image frames, and a display order of the reference frames; determining latency information of an image frame having a largest difference between an encoding order and a display order, from among the image frames that form the image sequence, based on the number of image frames to be reordered; and adding, to a mandatory sequence parameter set that is a set of information related to encoding of the image sequence, a first syntax indicating the determined maximum size of the buffer, a second syntax indicating the determined number of image frames to be ordered, and a third syntax indicating the determined latency information.

According to an aspect of another exemplary embodiment, there is provided an apparatus for encoding an image, the apparatus including: an encoder configured to determine reference frames respectively of image frames that form an image sequence by performing motion prediction and compensation, and to encode the image frames by using the determined reference frames; and an outputter configured to determine a maximum size of a buffer to decode the image frames by a decoder and a number of image frames to be reordered, based on an encoding order of the image frames, an encoding order of the reference frames referred to by the image frames, a display order of the image frames, and a display order of the reference frames, to determine latency information of an image frame having a largest difference between an encoding order and a display order, from among the image frames that form the image sequence, based on the number of image frames to be reordered, and to generate a bitstream by adding, to a mandatory sequence parameter set that is a set of information related to encoding of the image sequence, a first syntax indicating the determined maximum size of the buffer, a second syntax indicating the determined number of image frames to be ordered, and a third syntax indicating the determined latency information.

According to an aspect of another exemplary embodiment, there is provided a method of decoding an image, the method including: obtaining, from a bitstream, a first syntax indicating a maximum size of a buffer to decode each of image frames that form an image sequence, a second syntax indicating a number of image frames displayed after a post-decoded image frame and to be reordered, and a third syntax indicating latency information of an image frame having a largest difference between a decoding order and a display order from among the image frames that form the image sequence; setting, based on the first syntax, the maximum size of the buffer to decode the image sequence by the decoder; obtaining encoded data, in which the image frames are encoded, from the bitstream, and obtaining decoded image frames by decoding the obtained encoded data; storing the decoded image frames in the buffer of the decoder; and determining, based on the second syntax and the third syntax, whether to output an image frame stored in the buffer of the decoder, wherein the first syntax, the second syntax, and the third syntax are included in a mandatory sequence parameter set that is a set of information related to encoding of the image sequence.

According to an aspect of an exemplary embodiment, there is provided an apparatus for decoding an image, the apparatus including: an image data and encoding information extractor configured to obtain, from a bitstream, a first syntax indicating a maximum size of a buffer to decode each of image frames that form an image sequence, a second syntax indicating a number of image frames displayed after a post-decoded image frame and to be reordered, a third syntax indicating latency information of an image frame having a largest difference between a decoding order and a display order from among the image frames that form the image sequence, and encoded data in which the image frames are encoded; a decoder configured to obtain decoded image frames by decoding the obtained encoded data; and a buffer configured to store the decoded image frames, wherein the buffer sets the maximum size of the buffer to decode the image sequence by using the first syntax, and determines whether to output a stored image frame by using the second syntax and the third syntax, and wherein the first syntax, the second syntax, and the third syntax are included in a mandatory sequence parameter set that is a set of information related to encoding of the image sequence.

DESCRIPTION OF DRAWINGS

FIGS. 19A through 19D are diagrams for describing a MaxLatencyFrames syntax and a num_reorder_frames syntax, according to exemplary embodiments;

FIG. 20 is a flowchart illustrating an image encoding method according to an exemplary embodiment; and FIG. 21 is a flowchart illustrating an image decoding method according to an exemplary embodiment.

DETAILED DESCRIPTION OF EXEMPLARY EMBODIMENTS

Hereinafter, exemplary embodiments will be described in detail with reference to accompanying drawings. While describing exemplary embodiments, an image may be a still image or a moving image, and may be denoted as a video. Also, while describing exemplary embodiments, an image frame may be denoted as a picture.

Figure 1:
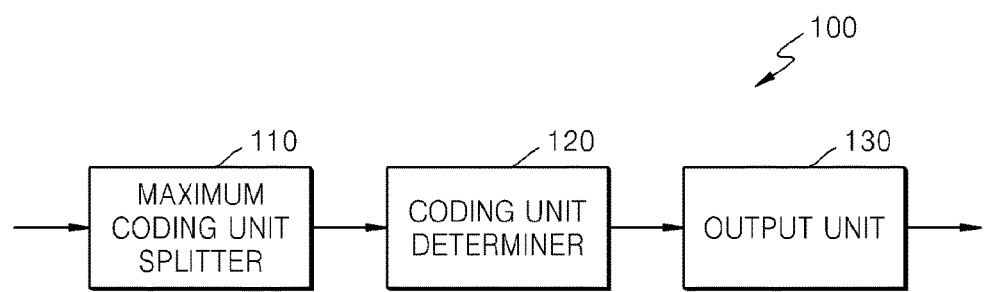
FIG. 1 is a block diagram of a video encoding apparatus according to an exemplary embodiment.

FIG. 1 is a block diagram of a video encoding apparatus 100 according to an exemplary embodiment.

The video encoding apparatus 100 includes a maximum coding unit splitter 110, a coding unit determiner 120, and an output unit 130 (e.g., outputter).

The maximum coding unit splitter 110 may split a current picture of an image based on a maximum coding unit for the current picture. If the current picture is larger than the maximum coding unit, image data of the current picture may be split into at least one maximum coding unit. The maximum coding unit according to an exemplary embodiment may be a data unit having a size of 32×32, 64×64, 128×128, 256×256, etc., wherein a shape of the data unit is a square having a width and length in squares of 2 that are higher than 8. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, coding units corresponding to depths may be split from the maximum coding unit to a minimum coding unit. A depth of the maximum coding unit may be determined as an uppermost depth, and the minimum coding unit may be determined as a lowermost coding unit. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include coding units that are split according to depths. Since the maximum coding unit according to an exemplary embodiment is split according to depths, the image data of a spatial domain included in the maximum coding unit may be hierarchically classified according to the depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the coding units corresponding to depths in units of the maximum coding units of the current picture, and selecting a depth having the least encoding error. The determined coded depth and the image data in each of the maximum coding units are output to the output unit 130.

The image data in each of the maximum coding units is encoded based on the coding units corresponding to depths, according to at least one depth equal to or below the maximum depth, and results of encoding the image data based on the coding units corresponding to depths are compared. A depth having the least encoding error may be selected after comparing encoding errors of the coding units corresponding to depths. At least one coded depth may be selected for each of the maximum coding units.

The size of the maximum coding unit is split as a coding unit is hierarchically split according to depths, and the number of coding units increases. Also, even if coding units included in one maximum coding unit correspond to the same depth, whether each of the coding units will be split to a lower depth is determined by measuring an encoding error of the image data of each of the coding units. Thus, since even data included in one maximum coding unit has a different encoding error corresponding to a depth, according to the location of the data, a coded depth may be differently set according to the location of the data. Accordingly, at least one coded depth may be set for one maximum coding unit, and the image data of the maximum coding unit may be divided according to coding units of the at least one coded depth.

Accordingly, the coding unit determiner 120 according to an exemplary embodiment may determine coding units having a tree structure included in a current maximum coding unit. The 'coding units having a tree structure' according to an exemplary embodiment include coding units corresponding to a depth determined to be the coded depth, from among all coding units corresponding to depths included in the current maximum coding unit. Coding units corresponding to a coded depth may be hierarchically determined according to depths in the same region of the maximum coding unit, and may be independently determined in different regions of the maximum coding unit. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit obtained by splitting the maximum coding unit once may be set to 1, and a depth of a coding unit obtained by splitting the maximum coding unit twice may be set to 2. If a coding unit obtained by splitting the maximum coding unit four times is the minimum coding unit, then depth levels of depths 0, 1, 2, 3 and 4 exist. Thus, the first maximum depth may be set to 4, and the second maximum depth may be set to 5.

Prediction-encoding and transformation may be performed on the maximum coding unit. Similarly, prediction-encoding and transformation are performed in units of maximum coding units, based on coding units corresponding to depths and according to depths equal to or less than the maximum depth.

Since the number of coding units corresponding to depths increases whenever the maximum coding unit is split according to depths, encoding including prediction-encoding and transformation should be performed on all of the coding units corresponding to depths generated as a depth deepens. For convenience of explanation, prediction-encoding and transformation will now be described based on a coding unit of a current depth, included in at least one maximum coding unit.

The video encoding apparatus 100 may variously select a size or shape of a data unit for encoding image data. In order to encode the image data, operations, such as prediction-encoding, transformation, and entropy encoding, are performed. At this time, the same data unit may be used for all of the operations or different data units may be used for each operation.

For example, the video encoding apparatus 100 may select not only a coding unit for encoding the image data, but also a data unit different from the coding unit so as to perform prediction-encoding on image data in the coding unit.

In order to prediction-encode the maximum coding unit, prediction-encoding may be performed based on a coding unit corresponding to a coded depth, i.e., based on a coding unit that is no longer split to coding units corresponding to a lower depth. Hereinafter, the coding unit that is no longer split and becomes a basis unit for prediction-encoding will now be referred to as a 'prediction unit'. Partitions obtained by splitting the prediction unit may include a data unit obtained by splitting at least one of a height and a width of the prediction unit.

For example, when a coding unit of 2N×2N (where N is a positive integer) is no longer split, this coding unit becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on a partition of 2N×2N, 2N×N, N×2N, or N×N. Also, the skip mode may be performed only on a partition of 2N×2N. Encoding may be independently performed on one prediction unit in each coding unit, and a prediction mode having a least encoding error may be selected.

Also, the video encoding apparatus 100 may perform transformation on the image data in a coding unit based not only on the coding unit for encoding the image data, but also based on a data unit that is different from the coding unit.

In order to perform transformation on the coding unit, transformation may be performed based on a data unit having a size smaller than or equal to that of the coding unit. For example, a data unit for transformation may include a data unit for the intra mode and a data unit for the inter mode.

Hereinafter, the data unit that is a basis of transformation may also be referred to as a transformation unit. Similarly to coding units having a tree structure according to an exemplary embodiment, a transformation unit in a coding unit may be recursively split into smaller sized transformation units. Thus, residual data in the coding unit may be divided according to transformation units having a tree structure according to transformation depths.

A transformation unit according to an exemplary embodiment may also be assigned a transformation depth denoting a number of times the height and width of a coding unit are split to obtain the transformation unit. For example, a transformation depth may be 0 when a size of a transformation unit for a 2N×2N current coding unit is 2N×2N, a transformation depth may be 1 when a size of a transformation unit for the 2N×2N current coding unit is N×N, and a transformation depth may be 2 when a size of a transformation unit for the 2N×2N current coding unit is N/2×N/2. That is, transformation units having a tree structure may also be set according to transformation depths.

Encoding information for each coded depth requires not only information about the coded depth, but also about information related to prediction-encoding and transformation. Accordingly, the coding unit determiner 120 may not only determine a coded depth having a least encoding error, but also determine a partition type in a prediction unit, a prediction mode for each prediction unit, and a size of a transformation unit for transformation.

Coding units having a tree structure included in a maximum coding unit and a method of determining a partition, according to exemplary embodiments, will be described in detail later with reference to FIGS. 3 through 12.

The coding unit determiner 120 may measure encoding errors of coding units corresponding to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode of each of depths, in a bitstream.

The encoded image data may be a result of encoding residual data of an image.

The information about the encoding mode of each of depths may include information about the coded depth, about the partition type in the prediction unit, the prediction mode, and the size of the transformation unit.

The information about the coded depth may be defined using split information according to depths, which indicates whether encoding is to be performed on coding units of a lower depth instead of a current depth. If a current depth of a current coding unit is the coded depth, then the current coding unit is encoded using coding units corresponding to the current depth, and split information about the current depth may thus be defined such that the current coding unit of the current depth may not be split any further into coding units of a lower depth. Reversely, if the current depth of the current coding unit is not the coded depth, then coding units of a lower depth should be encoded and the split information about the current depth may thus be defined such that the current coding unit of the current depth may be split into coding units of a lower depth.

If the current depth is not the coded depth, encoding is performed on the coding units of the lower depth. Since at least one coding unit of the lower depth exists in one coding unit of the current depth, encoding is repeatedly performed on each coding unit of the lower depth, and coding units having the same depth may thus be recursively encoded.

Since coding units having a tree structure should be determined in one maximum coding unit and information about at least one encoding mode is determined for each coding unit of a coded depth, information about at least one encoding mode may be determined for one maximum coding unit. Also, image data of the maximum coding unit may have a different coded depth according to the location thereof since the image data is hierarchically split according to depths. Thus, information about a coded depth and an encoding mode may be set for the image data.

Accordingly, the output unit 130 according to an exemplary embodiment may assign encoding information about a corresponding coded depth and an encoding mode to at least one of coding units, prediction units, and a minimum unit included in the maximum coding unit.

The minimum unit according to an exemplary embodiment is a rectangular data unit obtained by splitting a minimum coding unit of a lowermost depth by 4, and may be a maximum rectangular data unit that may be included in all of the coding units, prediction units, and transformation units included in the maximum coding unit.

For example, encoding information output via the output unit 130 may be classified into encoding information of each of coding units corresponding to depths, and encoding information of each of prediction units. The encoding information of each of coding units corresponding to depths may include prediction mode information and partition size information. The encoding information of each of prediction units may include information about an estimated direction of an inter mode, about a reference image index of the inter mode, about a motion vector, about a chroma component of the intra mode, and about an interpolation method of an intra mode. Information about a maximum size of coding units defined in units of pictures, slices, or GOPs, and information about a maximum depth may be inserted into a header of a bitstream.

The maximum coding unit splitter 110 and the coding unit determiner 120 correspond to a video coding layer that determines a reference frame of each of image frames that form an image sequence by performing motion prediction and compensation according to coding units with respect to each image frame, and encodes each image frame by using the determined reference frame.

Also, as will be described later, the output unit 130 generates a bitstream by mapping a max_dec_frame_buffering syntax indicating a maximum size of a buffer required to decode an image frame by a decoder, a num_reorder_frames syntax indicating the number of image frames required to be reordered, and a max_latency_increase syntax indicating latency information of an image frame having a largest difference between an encoding order and a display order from among the image frames that form the image sequence in a network abstraction layer (NAL) unit.

In the video encoding apparatus 100 according to an exemplary embodiment, coding units corresponding to depths may be coding units obtained by dividing a height or width of a coding unit of an upper depth by two. In other words, when the size of a coding unit of a current depth is 2N×2N, the size of a coding unit of a lower depth is N×N. Also, the 2N×2N coding unit may include four N×N coding units of the lower depth at most.

Accordingly, the video encoding apparatus 100 may form coding units having a tree structure by determining coding units having an optimum shape and size for each maximum coding unit, based on the size of each maximum coding unit and a maximum depth determined considering characteristics of a current picture. Also, since each maximum coding unit may be encoded according to any one of various prediction modes and transformation methods, an optimum encoding mode may be determined considering characteristics of coding units of various image sizes.

Thus, if an image having very high resolution or a very large amount of data is encoded in units of conventional macroblocks, a number of macroblocks per picture excessively increases. Thus, an amount of compressed information generated for each macroblock increases, and thus it is difficult to transmit the compressed information and data compression efficiency decreases. However, the video encoding apparatus 100 is capable of controlling a coding unit based on characteristics of an image while increasing a maximum size of the coding unit in consideration of a size of the image, thereby increasing image compression efficiency.

Figure 2:
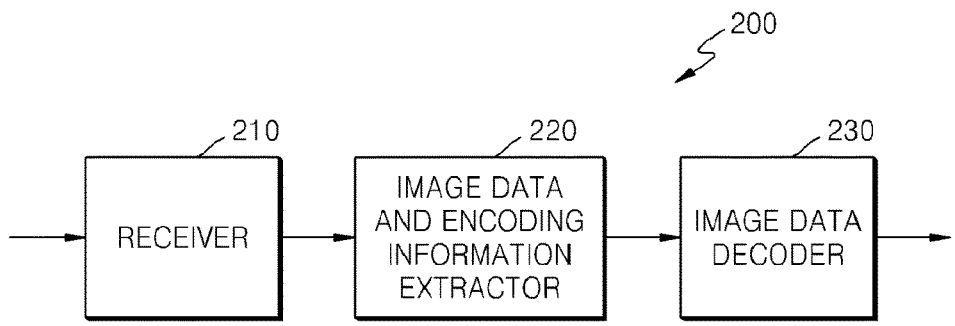
FIG. 2 is a block diagram of a video decoding apparatus according to an exemplary embodiment.

FIG. 2 is a block diagram of a video decoding apparatus 200 according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, which are used below to explain various processes of the video decoding apparatus 200, are identical to those of the video encoding apparatus 100 described above with reference to FIG. 1.

The receiver 210 receives and parses a bitstream of an encoded video. The image data and encoding information extractor 220 extracts encoded image data for each of coding units having a tree structure in units of maximum coding units, from the parsed bitstream, and then outputs the extracted image data to the image data decoder 230. The image data and encoding information extractor 220 may extract information about a maximum size of coding units of a current picture, from a header regarding the current picture.

Also, the image data and encoding information extractor 220 extracts information about a coded depth and an encoding mode for the coding units having the tree structure in units of the maximum coding unit, from the parsed bitstream. The extracted information about the coded depth and the encoding mode is output to the image data decoder 230. In other words, the image data in the bitstream may be split into the maximum coding units so that the image data decoder 230 may decode the image data in units of the maximum coding units.

The information about the coded depth and the encoding mode for each of the maximum coding units may be set for at least one coded depth. The information about the encoding mode for each coded depth may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode for each of the maximum coding units extracted by the image data and encoding information extractor 220 is information about a coded depth and an encoding mode determined to generate a minimum encoding error when an encoding side, e.g., the video encoding apparatus 100, repeatedly encodes each of coding units corresponding to depths in units of maximum coding units. Accordingly, the video decoding apparatus 200 may restore an image by decoding the image data according to the coded depth and the encoding mode that generates the minimum encoding error.

Since encoding information about the coded depth and the encoding mode may be assigned to data units from among corresponding coding units, prediction units, and a minimum unit, the image data and encoding information extractor 220 may extract the information about the coded depth and the encoding mode in units of the data units. If the information about the coded depth and the encoding mode for each of the maximum coding units is recorded in units of the data units, data units including information about the same coded depth and encoding mode may be inferred to be data units included in the same maximum coding unit.

The image data decoder 230 restores the current picture by decoding the image data in each of the maximum coding units, based on the information about the coded depth and the encoding mode for each of the maximum coding units. In other words, the image data decoder 230 may decode the encoded image data based on a parsed partition type, prediction mode, and transformation unit for each of the coding units having the tree structure included in each of the maximum coding units. A decoding process may include a prediction process including intra prediction and motion compensation, and an inverse transformation process.

The image data decoder 230 may perform intra prediction or motion compensation on each of the coding units according to partitions and a prediction mode thereof, based on the information about the partition type and the prediction mode of prediction units of each of coding units according to coded depths.

Also, in order to perform inverse transformation on each of the maximum coding units, the image data decoder 230 performs inverse transformation according to the transformation units of each of the coding units, based on size information of the transformation units of the deeper coding unit.

The image data decoder 230 may determine a coded depth of a current maximum coding unit, based on split information according to depths. If the split information indicates that image data is no longer split in the current depth, the current depth is a coded depth. Thus, the image data decoder 230 may decode image data of a current maximum coding unit by using the information about the partition type of the prediction unit, the prediction mode, and the size of the transformation unit of a coding unit corresponding to a current depth.

In other words, data units containing encoding information including the same split information may be gathered by observing encoding information assigned to a data unit from among the coding unit, the prediction unit, and the minimum unit, and the gathered data units may be considered as one data unit to be decoded according to the same encoding mode by the image data decoder 230.

Also, the receiver 210 and the image data and encoding information extractor 220 may perform a decoding process in an NAL, wherein a max_dec_frame_buffering syntax indicating a maximum size of a buffer required to decode an image frame by a decoder, a num_reorder_frames syntax indicating the number of image frames required to be reordered, and a max_latency_increase syntax indicating latency information of an image frame having a largest difference between a decoding order and a display order from among image frames that form an image sequence are obtained from a bitstream and output to the image data decoder 230.

The video decoding apparatus 200 may obtain information about a coding unit that generates a least encoding error by recursively encoding each of the maximum coding units, and may use the information to decode the current picture. In other words, the encoded image data in the coding units having the tree structure determined to be optimum coding units in units of the maximum coding units may be decoded.

Accordingly, even if image data has high resolution and a very large amount of data, the image data may be efficiently decoded to be restored by using a size of a coding unit and an encoding mode, which are adaptively determined according to characteristics of the image data, based on information about an optimum encoding mode received from an encoding side.

Hereinafter, methods of determining coding units according to a tree structure, a prediction unit, and a transformation unit, according to exemplary embodiments, will be described with reference to FIGS. 3 through 13.

Figure 3:
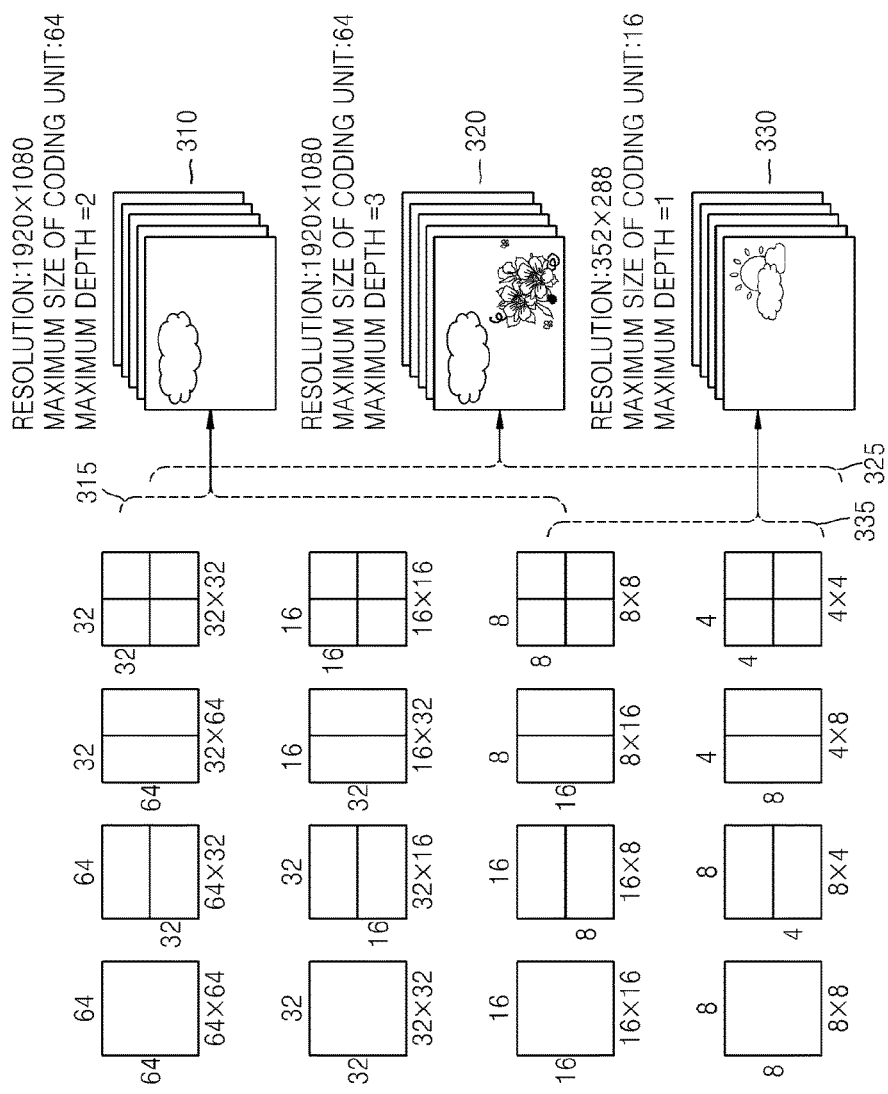
FIG. 3 illustrates a concept of coding units according to an exemplary embodiment.

FIG. 3 illustrates a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or an amount of data is large, a maximum size of a coding unit may be relatively large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
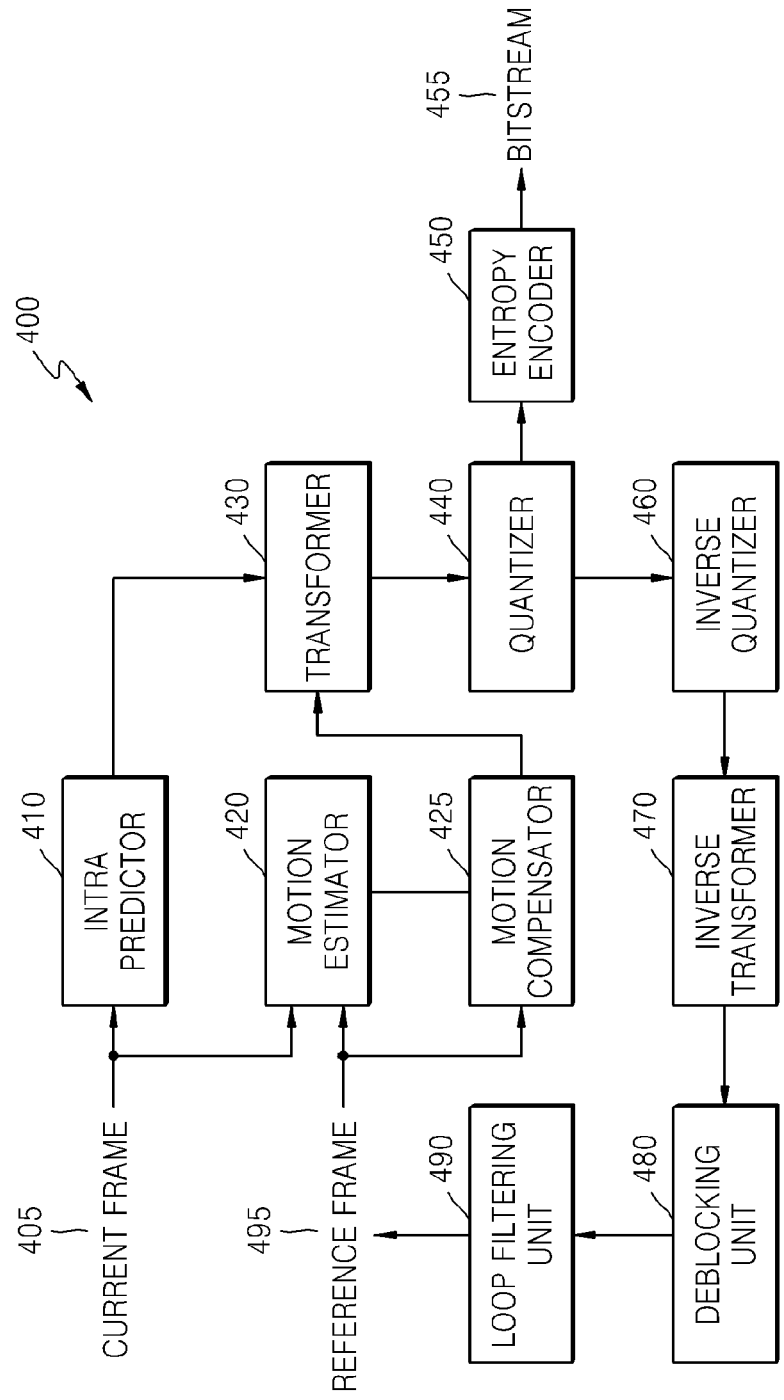
FIG. 4 is a block diagram of an image encoder based on coding units, according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. Specifically, an intra predictor 410 performs intra prediction on coding units in an intra mode from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470. The restored data in the spatial domain is output as the reference frame 495 after being post-processed through a deblocking unit 480 and a loop filtering unit 490. The quantized transformation coefficient may be output in a bitstream 455 through an entropy encoder 450. Specifically, the entropy encoder 450 may generate a bitstream by mapping a max_dec_frame_buffering syntax indicating a maximum size of a buffer required to decode an image frame by a decoder, a num_reorder_frames syntax indicating the number of image frames required to be reordered, and a MaxLatencyFrames syntax indicating a maximum number of a difference value between an encoding order and a display order of image frames that form an image sequence or a max_latency_increase syntax for determining the MaxLatencyFrames syntax in an NAL unit. Specifically, the entropy encoder 450 may add the max_dec_frame_buffering syntax, the num_reorder_frames syntax, and the max_latency_increase syntax to a sequence parameter set (SPS) that is header information including information related to encoding of an overall image sequence, as mandatory components.

In order to apply the image encoder 400 to the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Particularly, the intra predictor 410, the motion estimator 420, and the motion compensator 425 determine partitions and a prediction mode of each coding unit from among the coding units having the tree structure while considering the maximum size and the maximum depth of a current maximum coding unit. The transformer 430 determines the size of the transformation unit in each coding unit from among the coding units having the tree structure.

Figure 5:
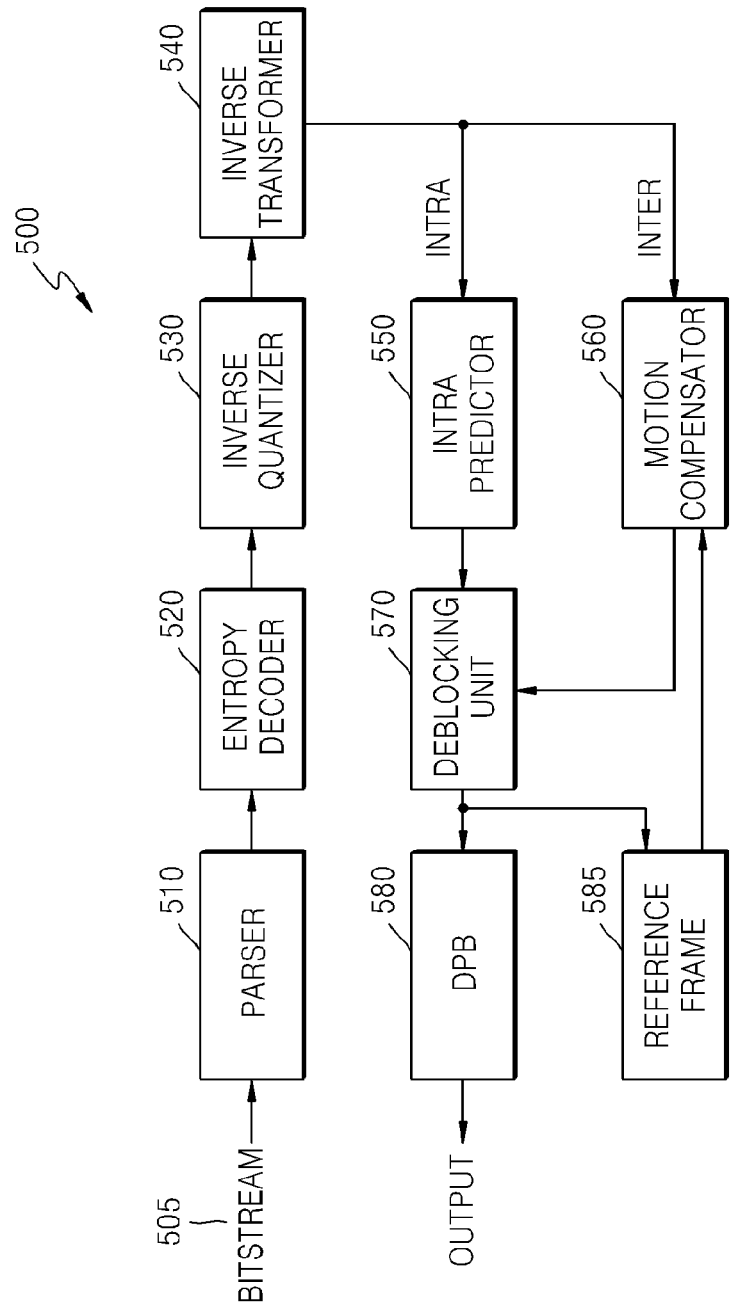
FIG. 5 is a block diagram of an image decoder based on coding units, according to an exemplary embodiment.

FIG. 5 is a block diagram of an image decoder 500 based on coding units, according to an exemplary embodiment.

A parser 510 parses a bitstream 505 to obtain encoded image data to be decoded and encoding information required to decode the encoded image data. Specifically, the parser 510 obtains and outputs a max_dec_frame_buffering syntax indicating a maximum size of a buffer required to decode an image frame included as a mandatory component in an SPS, a num_reorder_frames syntax indicating the number of image frames required to be reordered, and a max_latency_increase syntax for determining a MaxLatencyFrames syntax from a bitstream to an entropy decoder 520. In FIG. 5, the parser 510 and the entropy decoder 520 are illustrated to be individual components, but alternatively, processes of obtaining image data and obtaining syntax information related to encoded image data, which are performed by the parser 510, may be performed by the entropy decoder 520.

The encoded image data is output as inversely quantized data through the entropy decoder 520 and an inverse quantizer 530, and the inverse quantized data is restored to image data in a spatial domain through an inverse transformer 540.

With respect to the image data in the spatial domain, an intra predictor 550 performs intra prediction on coding units in an intra mode, and a motion compensator 560 performs motion compensation on coding units in an inter mode by using a reference frame 585.

Image frame data restored through the intra predictor 550 and the motion compensator 560 is post-processed through a deblocking unit 570 and output to a decoded picture buffer (DPB) 580. The DPB 580 stores a decoded image frame for storing of a reference frame, switching of a display order of an image frame, and outputting of an image frame. The DPB 580 stores the decoded image frame while setting a maximum size of a buffer required for normal decoding of an image sequence by using a max_dec_frame_buffering syntax indicating a maximum size of a buffer required to normally decode an image frame output from the parser 510 or the entropy decoder 520.

Also, the DPB 580 may determine whether to output a reference image frame pre-decoded and stored, by using a num_reorder_frames syntax indicating the number of image frames required to be reordered and a max_latency_increase syntax for determining a MaxLatencyFrames syntax. A process of outputting a reference image frame stored in the DPB 580 will be described in detail later.

In order to decode the image data by using the image data decoder 230 of the video decoding apparatus 200, the image decoder 500 may perform operations that are performed after an operation of the parser 510.

In order to apply the image decoder 500 to the video decoding apparatus 200, all elements of the image decoder 500, i.e., the parser 510, the entropy decoder 520, the inverse quantizer 530, the inverse transformer 540, the intra predictor 550, the motion compensator 560, and the deblocking unit 570 may perform decoding operations based on coding units having a tree structure, in units of maximum coding units. Particularly, the intra prediction 550 and the motion compensator 560 determine partitions and a prediction mode for each of the coding units having the tree structure, and the inverse transformer 540 determines a size of a transformation unit for each of the coding units.

Figure 6:
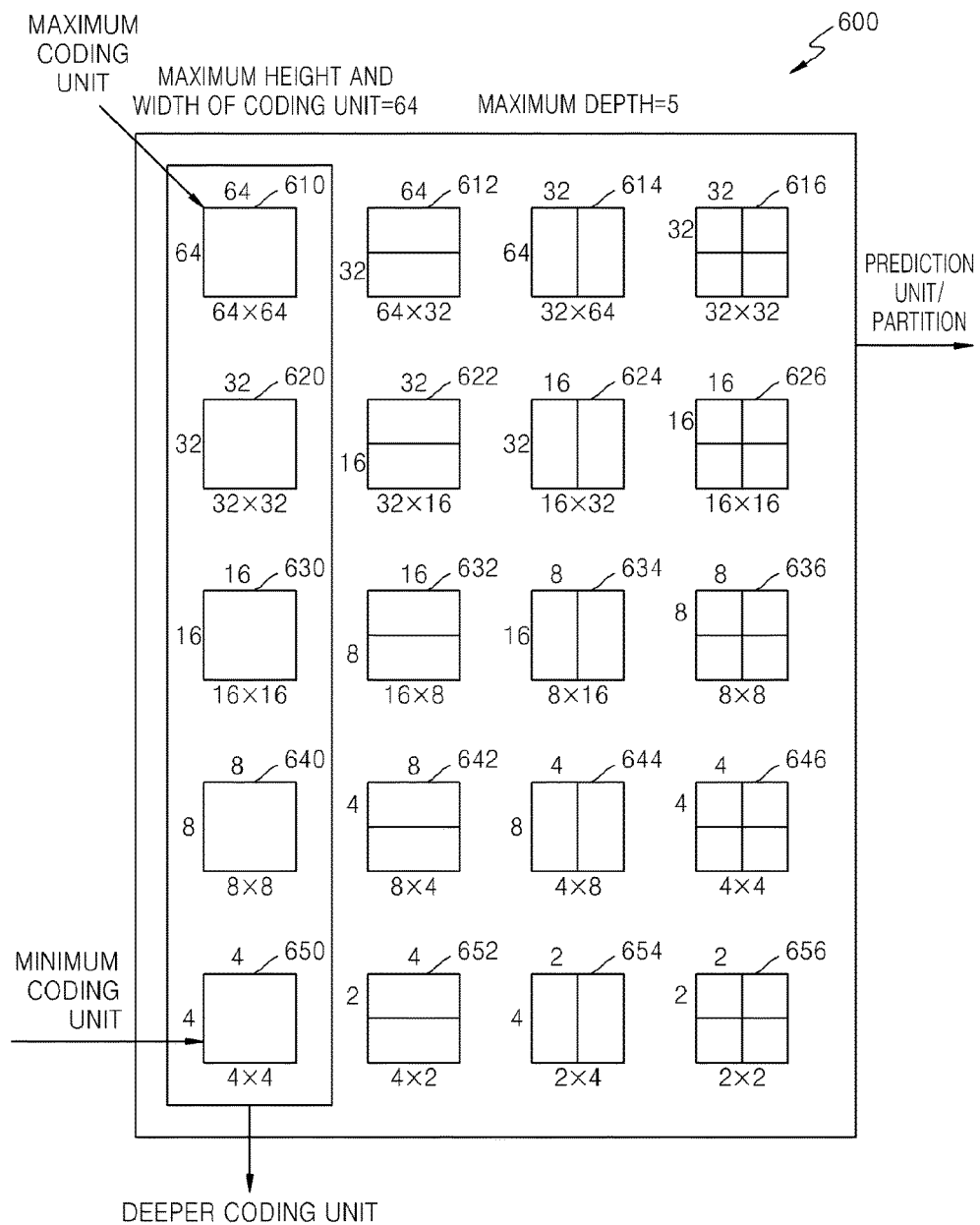
FIG. 6 is a diagram illustrating coding units corresponding to depths, and partitions, according to an exemplary embodiment.

FIG. 6 is a diagram illustrating coding units corresponding to depths, and partitions, according to an exemplary embodiment.

The video encoding apparatus 100 and the video decoding apparatus 200 according to an exemplary embodiment use hierarchical coding units to consider characteristics of an image. A maximum height, a maximum width, and a maximum depth of a coding unit may be adaptively determined according to the characteristics of the image, or may be differently set by a user. Sizes of coding units corresponding to depths may be determined according to the predetermined maximum size of the coding unit.

In a hierarchical structure 600 of coding units according to an exemplary embodiment, the maximum height and the maximum width of the coding units are each 64, and the maximum depth is 4. Since a depth deepens along a vertical axis of the hierarchical structure 600, a height and width of each of coding units corresponding to depths are each split.

Also, a prediction unit and partitions, which are bases for prediction-encoding each of the coding units corresponding to depths, are shown along a horizontal axis of the hierarchical structure 600.

Specifically, in the hierarchical structure 600, a coding unit 610 is a maximum coding unit, and has a depth of 0 and a size of 64×64 (height×width). As the depth deepens along the vertical axis, a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

A prediction unit and partitions of each coding unit are arranged along the horizontal axis according to each depth. If the coding unit 610 having the size of 64×64 and the depth of 0 is a prediction unit, the prediction unit may be split into partitions included in the coding unit 610, i.e., a partition 610 having a size of 64×64, partitions 612 having a size of 64×32, partitions 614 having a size of 32×64, or partitions 616 having a size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition 630 having a size of 16×16, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition 640 having a size of 8×8, partitions 642 having a size of 8×4, partitions 644 having a size of 4×8, and partitions 646 having a size of 4×4.

The coding unit 650 having the size of 4×4 and the depth of 4 is the minimum coding unit having a lowermost depth. A prediction unit of the coding unit 650 is set to only a partition 650 having a size of 4×4.

In order to determine a coded depth of the maximum coding unit 610, the coding unit determiner 120 of the video encoding apparatus 100 encodes all coding units corresponding to each depth, included in the maximum coding unit 610.

As the depth deepens, a number of coding units, which correspond to each depth and include data having the same range and the same size, increases. For example, four coding units corresponding to a depth of 2 are required to cover data included in one coding unit corresponding to a depth of 1. Accordingly, in order to compare results of encoding the same data according to depths, the coding unit corresponding to the depth of 1 and the four coding units corresponding to the depth of 2 are each encoded.

In order to perform encoding in units of depths, a least encoding error of each of the depths may be selected as a representative encoding error by encoding prediction units in each of the coding units corresponding to the depths, along the horizontal axis of the hierarchical structure 600. Alternatively, a least encoding error may be searched for by performing encoding in units of depths and comparing least encoding errors according to the depths, as the depth deepens along the vertical axis of the hierarchical structure 600.

A depth and a partition having the least encoding error in the maximum coding unit 610 may be selected as a coded depth and a partition type of the maximum coding unit 610.

Figure 7:
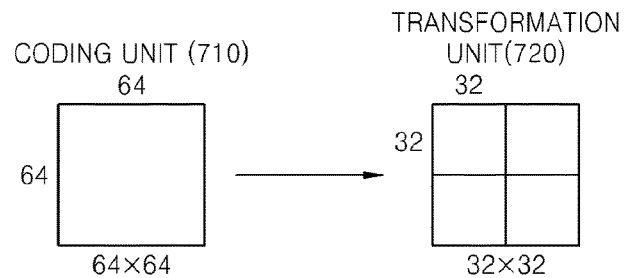
FIG. 7 is a diagram illustrating a relationship between a coding unit and transformation units, according to an exemplary embodiment.

FIG. 7 is a diagram illustrating a relationship between a coding unit 710 and transformation units 720, according to an exemplary embodiment.

The video encoding apparatus 100 (or the video decoding apparatus 200) according to an exemplary embodiment encodes (or decodes) an image in units of maximum coding units, based on coding units having sizes smaller than or equal to the maximum coding units. During the encoding, a size of each transformation unit used to perform transformation may be selected based on a data unit that is not larger than a corresponding coding unit.

For example, in the video encoding apparatus 100 (or the video decoding apparatus 200), if a size of the coding unit 710 is 64×64, transformation may be performed using the transformation units 720 having a size of 32×32.

Also, data of the coding unit 710 having the size of 64×64 may be encoded by performing transformation on each of transformation units having a size of 32×32, 16×16, 8×8, and 4×4, which are smaller than 64×64, and then a transformation unit having a least coding error may be selected.

Figure 8:
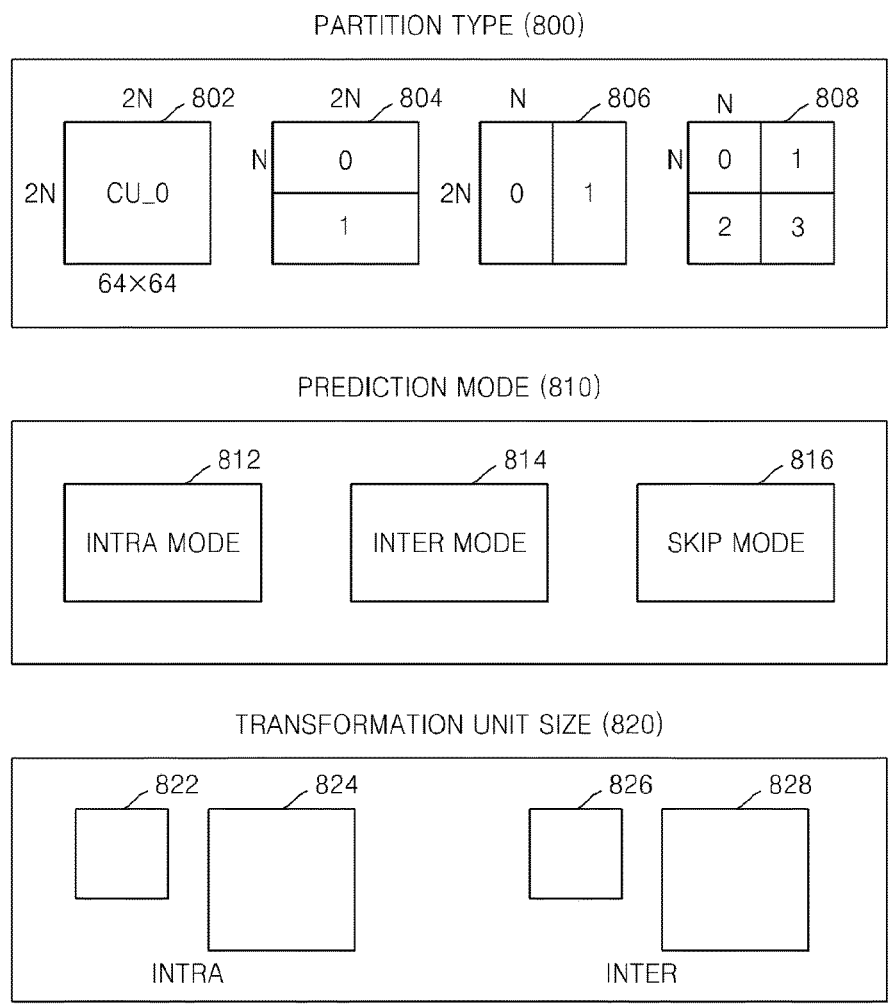
FIG. 8 is a diagram illustrating encoding information corresponding to depths, according to an exemplary embodiment.

FIG. 8 is a diagram illustrating encoding information corresponding to depths, according to an exemplary embodiment.

The output unit 130 of the video encoding apparatus 100 may encode and transmit information 800 about a partition type, information 810 about a prediction mode, and information 820 about transformation unit size for each coding unit corresponding to a coded depth, as information about an encoding mode.

The information 800 indicates information about a shape of a partition obtained by splitting a prediction unit of a current coding unit, as a data unit for prediction-encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the information 800 is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction-encoding the partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding coding units corresponding to depths.

Figure 9:
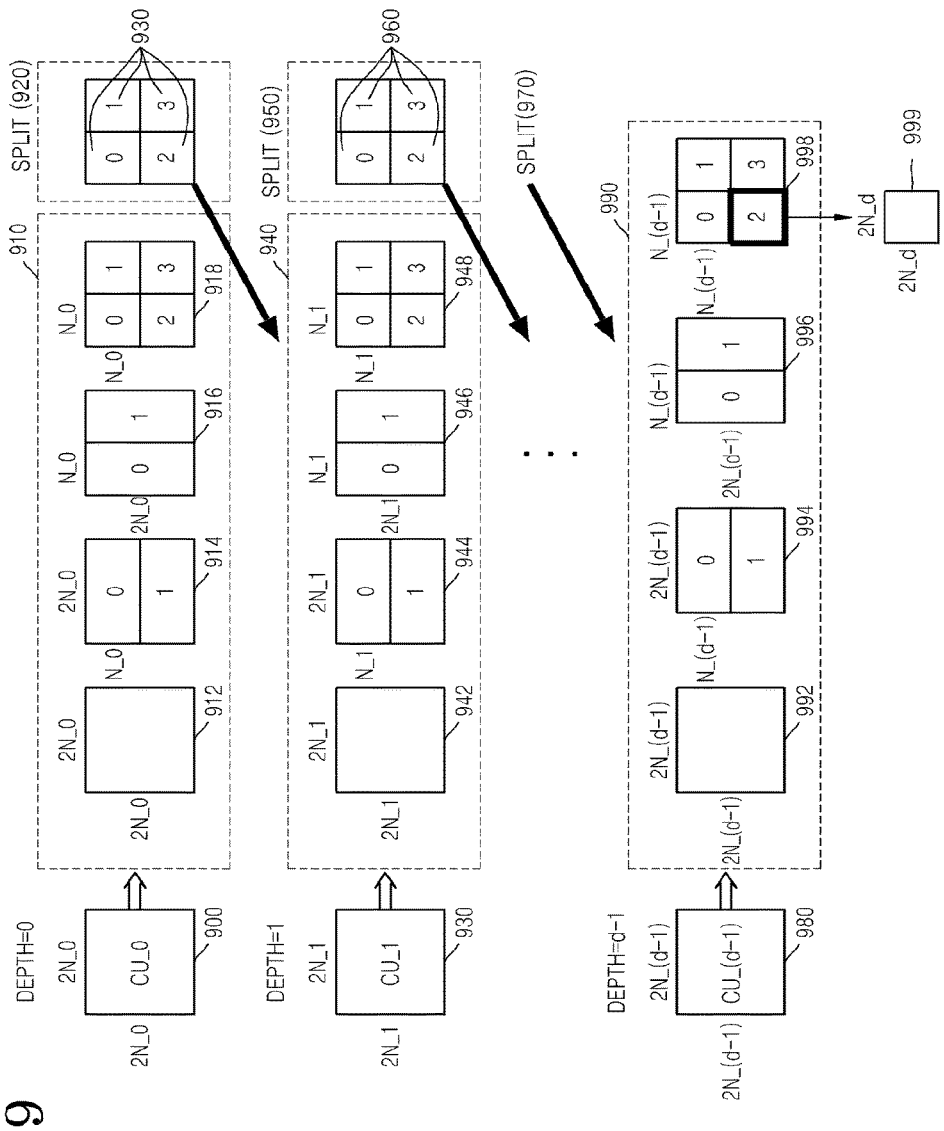
FIG. 9 is a diagram illustrating coding units corresponding to depths, according to an exemplary embodiment.

FIG. 9 is a diagram illustrating coding units corresponding to depths, according to an exemplary embodiment.

Split information may be used to indicate a depth change. The split information indicates whether a coding unit of a current depth is split into coding units of a lower depth.

A prediction unit 910 for prediction-encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. Although FIG. 9 illustrates only the partition types 912 through 918 which are obtained by symmetrically splitting the prediction unit 910, a partition type is not limited thereto, and the partitions of the prediction unit 910 may include asymmetrical partitions, partitions having an arbitrary shape, and partitions having a geometrical shape.

Prediction-encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. Prediction-encoding may be performed on the partitions having the sizes of 2N_0×2N_0, N_0×2N_0, 2N_0×N_0, and N_0×N_0, according to an intra mode and an inter mode. Prediction-encoding is performed only on the partition having the size of 2N_0×2N_0, according to a skip mode.

If an encoding error is smallest in one of the partition types 912 through 916, the prediction unit 910 may not be split into a lower depth.

If an encoding error is the smallest in the partition type 918, a depth is changed from 0 to 1 to split the partition type 918 in operation 920, and encoding is repeatedly performed on coding units 930 having partitions of a depth of 2 and a size of N_0×N_0 to search for a minimum encoding error.

A prediction unit 940 for prediction-encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having a size of N_1×N_1, a depth is changed from 1 to 2 to split the partition type 948 in operation 950, and encoding is repeatedly performed on coding units 960 having a depth of 2 and a size of N_2×N_2 so as to search for a minimum encoding error.

When a maximum depth is d, coding units corresponding to depths may be set up to when a depth becomes d−1, and split information may be set up to when a depth is d−2. In other words, when encoding is performed up to when the depth is d−1 after a coding unit corresponding to a depth of d−2 is split in operation 970, a prediction unit 990 for prediction-encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction-encoding may be repeatedly performed on one partition having a size of 2N_(d−1)×2N_(d−1), two partitions having a size of 2N_(d−1)×N_(d−1), two partitions having a size of N_(d−1)×2N_(d−1), and four partitions having a size of N_(d−1)×N_(d−1) from among the partition types 992 through 998 so as to search for a partition type having a minimum encoding error.

Even when the partition type 998 has the minimum encoding error, since a maximum depth is d, a coding unit CU_(d−1) having a depth of d−1 is no longer split to a lower depth, and a coded depth for a current maximum coding unit 900 is determined to be d−1 and a partition type of the coding unit 900 may be determined to be N_(d−1)×N_(d−1). Also, since the maximum depth is d, split information is not set for a coding unit 952 having a depth of (d−1).

A data unit 999 may be a 'minimum unit' for the current maximum coding unit 900. A minimum unit according to an exemplary embodiment may be a rectangular data unit obtained by splitting a minimum unit having a lowest coded depth by 4. By performing encoding repeatedly as described above, the video encoding apparatus 100 may determine a coded depth by comparing encoding errors according to depths of the coding unit 900 and selecting a depth having the least encoding error, and set a partition type and a prediction mode for the coding unit 900 as an encoding mode of the coded depth.

As such, minimum encoding errors according to depths, i.e., the depths of 0, 1, . . . , d−1, and d, are compared with one another, and a depth having the least encoding error may be determined as a coded depth. The coded depth, the partition type of the prediction unit, and the prediction mode may be encoded and transmitted as information about an encoding mode. Also, since a coding unit is split from the depth of 0 to the coded depth, only split information of the coded depth is set to 0, and split information of the other depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth corresponding to split information '0', as a coded depth, based on split information according to depths, and may use information about an encoding mode of the coded depth during a decoding process.

Figure 10:
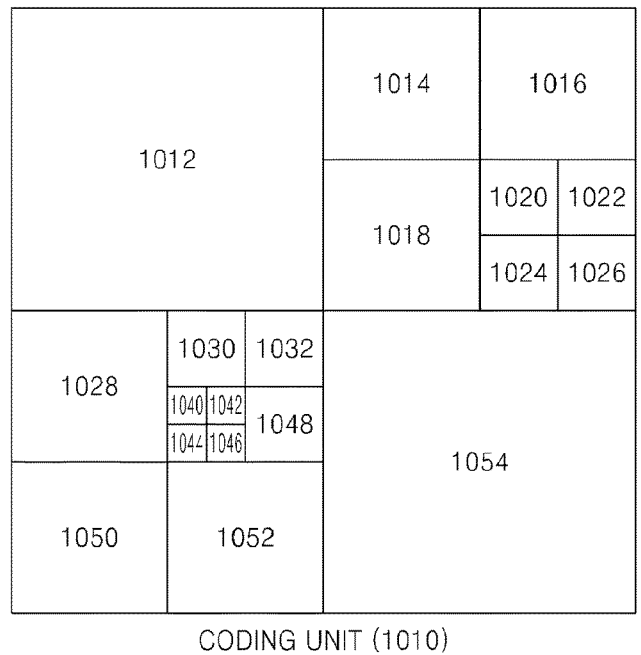
FIGS. 10, 11, and 12 are diagrams illustrating a relationship between coding units, prediction units, and transformation units, according to an exemplary embodiment.
Figure 11:
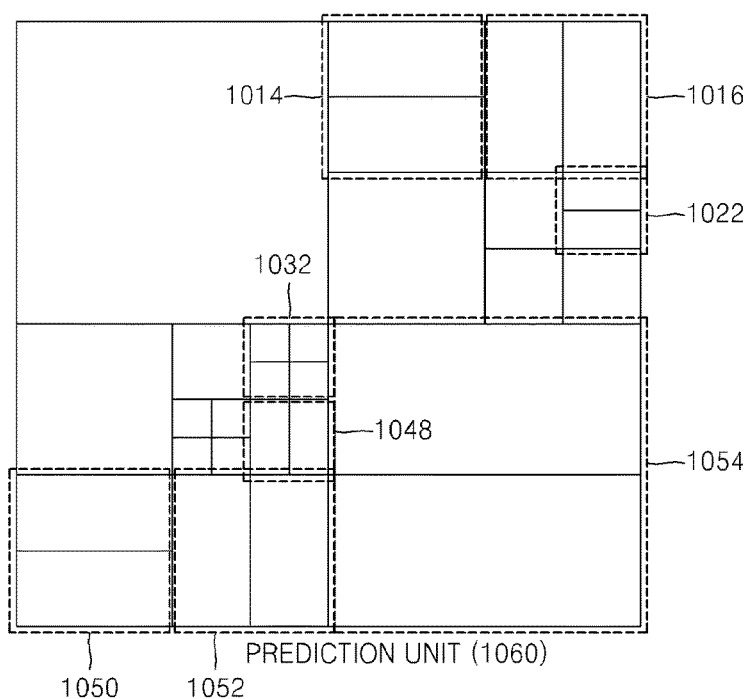
Figure 12:
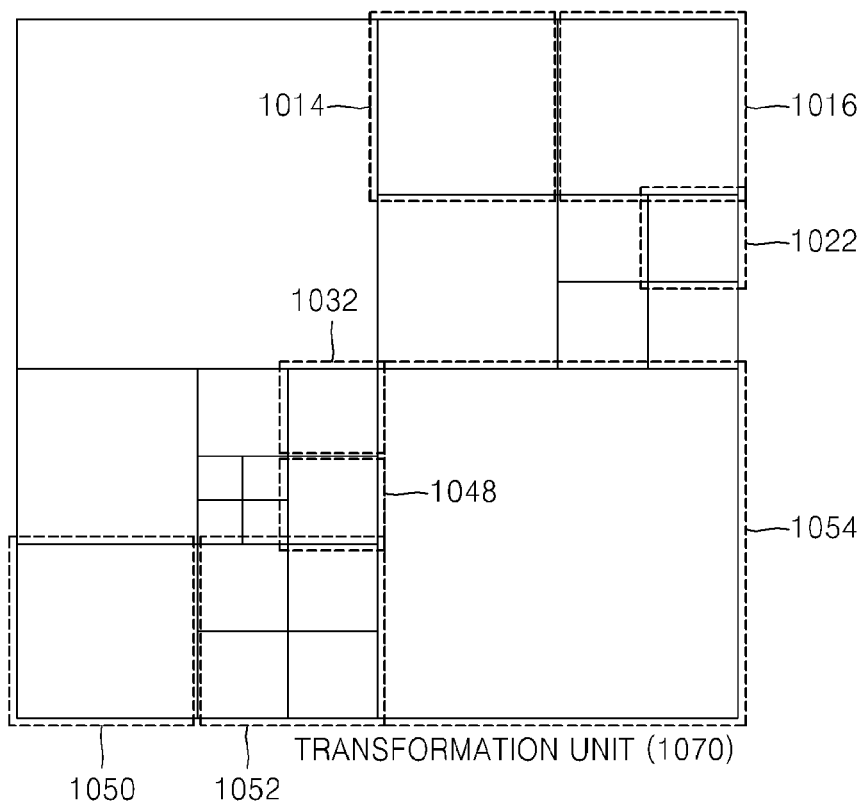

FIGS. 10, 11, and 12 are diagrams illustrating a relationship between coding units 1010, prediction units 1060, and transformation units 1070, according to an exemplary embodiment.

Among the prediction units 1060, some partitions 1014, 1016, 1022, 1032, 1048, 1050, 1052, and 1054 are split into partitions split from coding units. In other words, the partitions 1014, 1022, 1050, and 1054 are 2N×N partition types, partitions 1016, 1048, and 1052 are N×2N partition types, and the partition 1032 is a N×N partition type. Prediction units and partitions of the coding units 1010 are smaller than or equal to coding units corresponding thereto.

Among the transformation units 1070, transformation or inverse transformation is performed on image data corresponding to coding unit 1052, based on a data unit that is smaller than the coding unit 1052. Also, transformation units 1014, 1016, 1022, 1032, 1048, 1050, 1052, and 1054 are data units different from corresponding prediction units and partitions among the prediction units 1060, in terms of sizes and shapes. In other words, the video encoding apparatus 100 and the video decoding apparatus 200 according to an exemplary embodiment may individually perform intra prediction, motion estimation, motion compensation, transformation, and inverse transformation on the same coding unit, based on different data units Accordingly, an optimum coding unit may be determined by recursively encoding coding units having a hierarchical structure, in units of regions of each maximum coding unit, thereby obtaining coding units having a recursive tree structure. Encoding information may include split information about a coding unit, information about a partition type, information about a prediction mode, and information about a size of a transformation unit. Table 1 shows an example of encoding information that may be set by the video encoding apparatus 100 and the video decoding apparatus 200.

TABLE 1

| | Split Information 0 (Encoding on Coding Unit having Size of 2N × 2N and Current Depth of d) | | | | Split Information 1 |
|---|---|---|---|---|---|
| | | | Size of Transformation Unit | | Repeatedly Encode Coding Units having Lower Depth of d + 1 |
| Prediction Mode | Partition Type | | Split Information 0 of Transformation Unit | Split Information 1 of Transformation Unit | |
| | Symmetrical Partition Type | Asymmetrical Partition Type | | | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The coding units 1010 are coding units corresponding to coded depths for a maximum coding unit, determined by the video encoding apparatus 100. The prediction units 1060 are partitions of prediction units of the respective coding units 1010, and the transformation units 1070 are transformation units of the respective coding units 1010.

Among the coding units 1010, if a depth of a maximum coding unit is 0, then coding units 1012 and 1054 have a depth of 1, coding units 1014, 1016, 1018, 1028, 1050, and 1052 have a depth of 2, coding units 1020, 1022, 1024, 1026, 1030, 1032, and 1048 have a depth of 3, and coding units 1040, 1042, 1044, and 1046 have a depth of 4.

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which the current coding unit is no longer split into coding units of a lower depth, is a coded depth, and thus information about a partition type, a prediction mode, and a size of a transformation unit may be defined for the coded depth. If the current coding unit is further split according to the split information, encoding is independently performed on four split coding units of a lower depth.

The prediction mode may be one of an intra mode, an inter mode, and a skip mode. The intra mode and the inter mode may be defined for all partition types, and the skip mode is defined only for a 2N×2N partition type.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N to be equal to the size of the current coding unit. If the split information of the transformation unit is 1, transformation units may be obtained by splitting the current coding unit. Also, a size of a transformation unit may be N×N when a partition type of the current coding unit having the size of 2N×2N is a symmetrical partition type, and may be N/2×N/2 when the partition type of the current coding unit is an asymmetrical partition type.

The encoding information about coding units having a tree structure may be assigned to at least one of a coding unit corresponding to a coded depth, a prediction unit, and a minimum unit. The coding unit corresponding to the coded depth may include at least one prediction unit and at least one minimum unit that contain the same encoding information.

Accordingly, whether adjacent data units are included in coding units corresponding to the same coded depth may be determined by comparing encoding information of the adjacent data units. Also, a coding unit corresponding to a coded depth may be determined using encoding information of a data unit. Thus, a distribution of coded depths in a maximum coding unit may be determined.

Accordingly, if the current coding unit is predicted based on encoding information of adjacent data units, encoding information of data units in coding units corresponding to depths adjacent to the current coding unit may be directly referred to and used.

Alternatively, if the current coding unit is predicted based on adjacent coding units, then adjacent coding units may be referred to by searching data units adjacent to the current coding unit from among coding units corresponding to depths, based on encoding information of adjacent coding units corresponding to depths.

Figure 13:
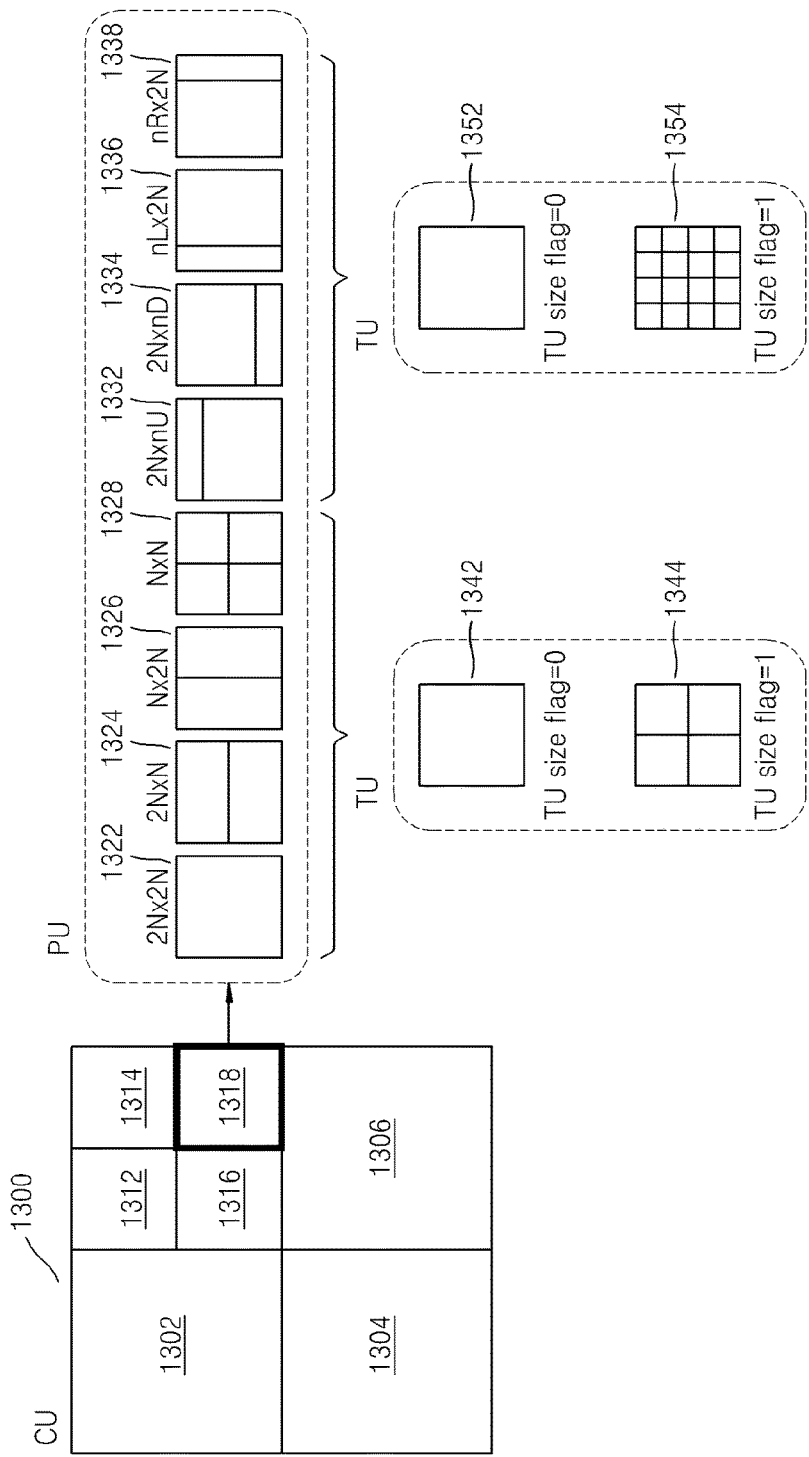
FIG. 13 is a diagram illustrating a relationship between a coding unit, a prediction unit, and a transformation unit, according to encoding mode information of Table 1.

FIG. 13 is a diagram illustrating a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information thereof may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

For example, if the partition type is set to be a symmetrical partition type, e.g., the partition type 1322, 1324, 1326, or 1328, then a transformation unit 1342 having a size of 2N×2N is set when transformation unit split information (TU size flag) is '0', and a transformation unit 1344 having a size of N×N is set when the TU size flag is '1'.

If the partition type is set to be an asymmetrical partition type, e.g., the partition type 1332, 1334, 1336, or 1338, then a transformation unit 1352 having a size of 2N×2N is set when a TU size flag is 0, and a transformation unit 1354 having a size of N/2×N/2 is set when a TU size flag is 1.

Figure 14:
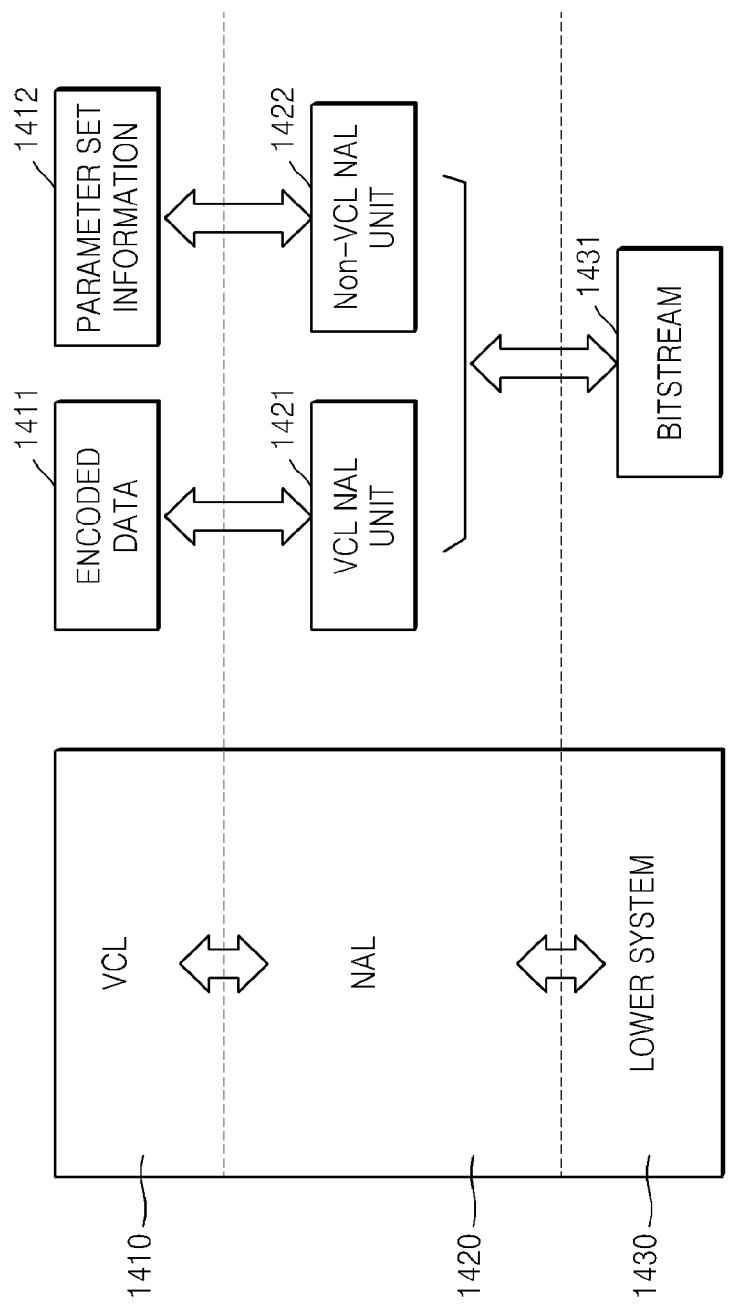
FIG. 14 is a diagram of an image encoding process and an image decoding process, which are hierarchically classified, according to an exemplary embodiment.

FIG. 14 is a diagram of an image encoding process and an image decoding process, which are hierarchically classified, according to an exemplary embodiment.

Encoding processes performed by the video encoding apparatus 100 of FIG. 1 or the image encoder 400 of FIG. 4 may be classified into an encoding process performed in a video coding layer (VCL) 1410 that handles an image encoding process itself, and an encoding process performed in an NAL 1420 generating image data and additional information encoded between the VCL 1410 and a lower system 1430 that transmits and stores encoded image data, as a bitstream according to a predetermined format as shown in FIG. 14. Encoded data 1411 that is an output of encoding processes of the maximum coding unit splitter 110 and the coding unit determiner 120 of the video encoding apparatus 100 of FIG. 1 is VCL data, and the encoded data 1411 is mapped to a VCL NAL unit 1421 through the output unit 130. Also, information directly related to the encoding process of the VCL 1410, such as split information, partition type information, prediction mode information, and transformation unit size information about a coding unit used to generate the encoded data 1411 by the VCL 1410, is also mapped to the VCL NAL unit 1421. Parameter set information 1412 related to the encoding process is mapped to a non-VCL NAL unit 1422. In particular, according to an exemplary embodiment, a max_dec_frame_buffering syntax indicating a maximum size of a buffer required to decode an image frame by a decoder, a num_reorder_frames syntax indicating the number of image frames required to be reordered, and a max_latency_increase syntax for determining a MaxLatencyFrames syntax are mapped to the non-VCL NAL unit 1422. Both the VCL NAL unit 1421 and the non-VCL NAL unit 1422 are NAL units, wherein the VCL NAL unit 1421 includes image data that is compressed and encoded, and the non-VCL NAL unit 1422 includes parameters corresponding to an image sequence and header information of a frame.

Similarly, decoding processes performed by the video decoding apparatus 200 of FIG. 2 or the image decoder 500 of FIG. 5 may be classified into a decoding process performed in the VCL 1410 handling an image decoding process itself, and a decoding process performed in the NAL 1420 obtaining encoded image data and additional information from a bitstream received and read between the VCL 1410 and the lower system 1430 that receives and reads the encoded image data, as shown in FIG. 14. The decoding processes performed in the receiver 210 and the image data and encoding information extractor 220 of the video decoding apparatus 200 of FIG. 2 correspond to the decoding processes of the NAL 1420, and the decoding processes of the image data decoder 230 correspond to the decoding processes of the VCL 1410. In other words, the receiver 210 and the image data and encoding information extractor 220 obtain, from a bitstream 1431, the VCL NAL unit 1421 including information used to generate encoded image data and encoded data, such as split information, partition type information, prediction mode information, and transformation unit size information of a coding unit, and the non-VCL NAL unit 1422 including parameter set information related to the encoding process. In particular, according to an exemplary embodiment, a max_dec_frame_buffering syntax indicating a maximum size of a buffer required to decode an image frame by a decoder, a num_reorder_frames syntax indicating the number of image frames required to be reordered, and a max_latency_increase syntax for determining a MaxLatencyFrames syntax are included in the non-VCL NAL unit 1422.

Figure 15:
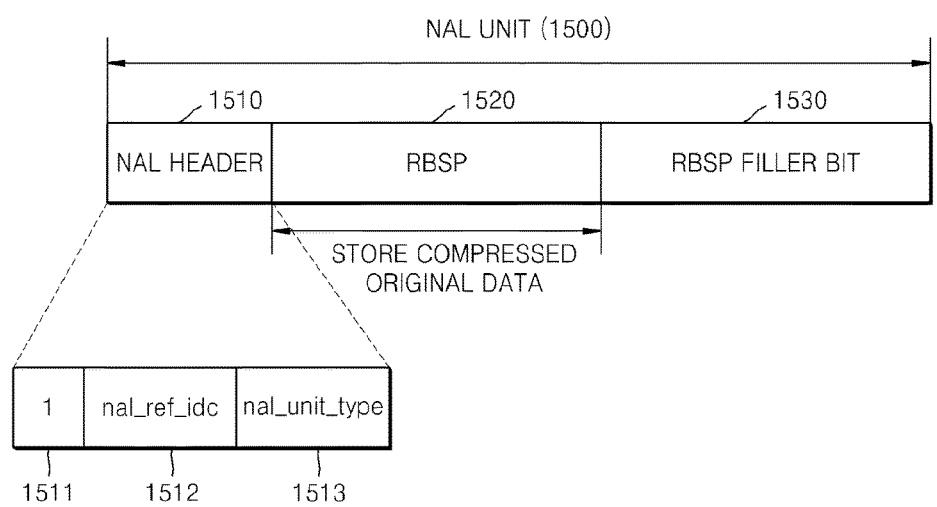
FIG. 15 is a diagram of a structure of a network abstraction layer (NAL) unit, according to an exemplary embodiment.

FIG. 15 is a diagram of a structure of an NAL unit 1500, according to an exemplary embodiment.

Referring to FIG. 15, the NAL unit 1500 includes an NAL header 1510 and a raw byte sequence payload (RBSP) 1520. An RBSP filler bit 1530 is a length adjusting bit added at the end of the RBSP 1520 to express a length of the RBSP 1520 in a multiple of 8 bits. The RBSP filler bit 1530 starts from '1' and includes continuous '0's determined according to the length of the RBSP 1520 to have a pattern like '100 . . . '. By searching for '1' that is an initial bit value, a location of the last bit of the RBSP 1520 may be determined.

The NAL header 1510 includes flag information (nal_ref_idc) 1512 indicating whether a slice constituting a reference picture of a corresponding NAL unit is included, and an identifier (nal_unit_type) 1513 indicating that a type of NAL unit. '1' 1511 at the beginning of the NAL header 1510 is a fixed bit.

The NAL unit 1500 may be classified into an instantaneous decoding refresh (IDR) picture, a clean random access (CRA) picture, an SPS, a picture parameter set (PPS), supplemental enhancement information (SEI), and an adaption parameter set (APS) according to a value of the nal_unit_type 1513. Table 2 shows a type of the NAL unit 1500 according to values of the nal_unit_type 1513.

TABLE 2

| nal_unit_type | Type of NAL unit |
|---|---|
| 0 | Unspecified |
| 1 | Picture excluding CRA and picture slice excluding IDR |
| 2-3 | Reserved for future expansion |
| 4 | Slice of CRA picture |
| 5 | Slice of IDR picture |
| 6 | SEI |
| 7 | SPS |
| 8 | PPS |
| 9 | Access unit (AU) delimiter |
| 10-11 | Reserved for future expansion |
| 12 | Filler data |
| 13 | Reserved for future expansion |
| 14 | APS |
| 15-23 | Reserved for future expansion |
| 24-64 | Unspecified |

As described above, according to an exemplary embodiment, the max_dec_frame_buffering syntax, the num_reorder_frames syntax, and the max_latency_increase syntax are included in the NAL unit, specifically the SPS corresponding to the header information of the image sequence, as mandatory components.

Hereinafter, processes of determining the max_dec_frame_buffering syntax, the num_reorder_frames syntax, and the max_latency_increase syntax, which are included as the mandatory components of the SPS, during the encoding process, will be described in detail.

An image frame decoded in a VCL is stored in the DPB 580 that is an image buffer memory of the image decoder 500. The DPB 580 marks each stored picture as a short-term reference picture that is referred to for a short term, a long-term reference picture that is referred to for a long term, or a non-reference picture that is not referred to. A decoded picture is stored in the DPB 580, is reordered according to an output order, and is output from the DPB 580 at an output timing or at an assigned time when the decoded picture is not referred to by another image frame.

In a general codec, such as H.264 AVC codec, a maximum size of a DBP required to restore an image frame is defined by a profile and a level, or through video usability information (VUI) that is selectively transmitted. For example, the maximum size of DPB defined by H.264 AVC codec is defined as Table 3 below.

TABLE 3

| Resolution | WQVGA 400 × 240 | WVGA 800 × 480 | HD 720p 1280 × 720 | HD 10809 1920 × 1080 |
|---|---|---|---|---|
| Minimum level | 1.3 | 3.1 | 3.1 | 4 |
| MaxDPB | 891.0 | 6750.0 | 6750.0 | 12288.0 |
| MaxDpbSize | 13 | 12 | 5 | 5 |

In Table 3, the maximum size of DPB is defined with respect to a 30 Hz image, and in H.264 AVC codec, the maximum size of DPB is determined by using the max_dec_frame_buffering syntax selectively transmitted through VUI, or according to a table pre-determined according to a profile and a level as shown in Table 3 if the max_dec_frame_buffering syntax is not included in the VUI. If a resolution of a decoder is 400×240 (WQVGA) and a frequency of an output image is 30 Hz, a maximum size (MaxDpbSize) of the DPB is 13, i.e., the maximum size of the DPB is set to store 13 decoded pictures.

In a general video codec, information about a maximum size of a DPB is not necessarily transmitted, but is selectively transmitted. Accordingly, in the general video codec, information about a maximum size of a DPB required to decode an image sequence by a decoder cannot be always used. When such information is not transmitted, the decoder uses a maximum size of a DPB pre-determined according to a profile and a level, as shown in Table 3 above. However, a size of DPB actually required during processes of encoding and decoding an image sequence is often smaller than the maximum size of the DPB of Table 3. Thus, if the pre-determined maximum size, as shown in Table 3, is used, system resources of the decoder may be wasted. Also, according to the general video codec, since the size of the DPB of the decoder is smaller than the pre-determined maximum size of Table 3 but is larger than a size actually required to restore an image frame, if information about a maximum size of the DPB required for a decoding process is not transmitted despite that the decoder is able to decode an image sequence, the pre-determined maximum size of Table 3 is set as the size of the DPB required for the decoding process, and thus the decoding process may be unable to be performed. Accordingly, an image encoding method and apparatus according to an exemplary embodiment transmit a maximum size of a DPB to a decoding apparatus after including the maximum size as a mandatory component of an SPS, and an image decoding method and apparatus may set a maximum size of a DPB by using a maximum size included in an SPS.

Figure 16A:
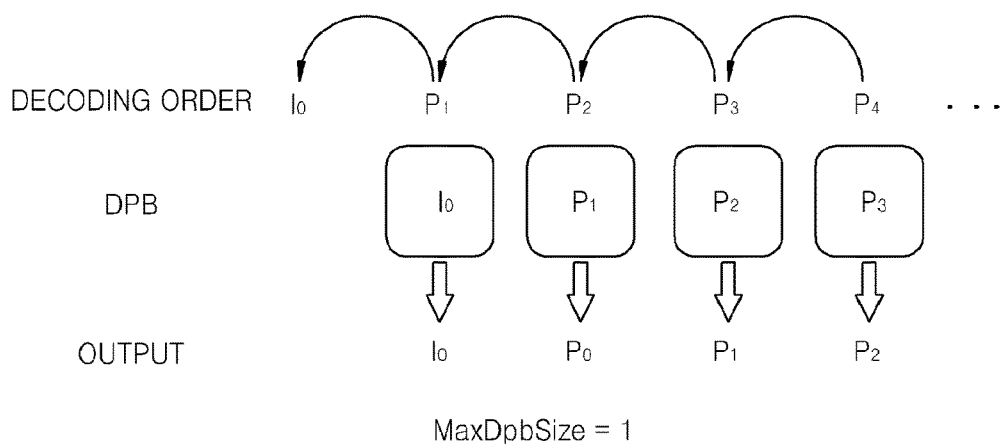
FIGS. 16A and 16B are reference diagrams for describing maximum size information of a decoded picture buffer (DPB) required according to a decoding order during an encoding process of an image sequence.
Figure 16B:
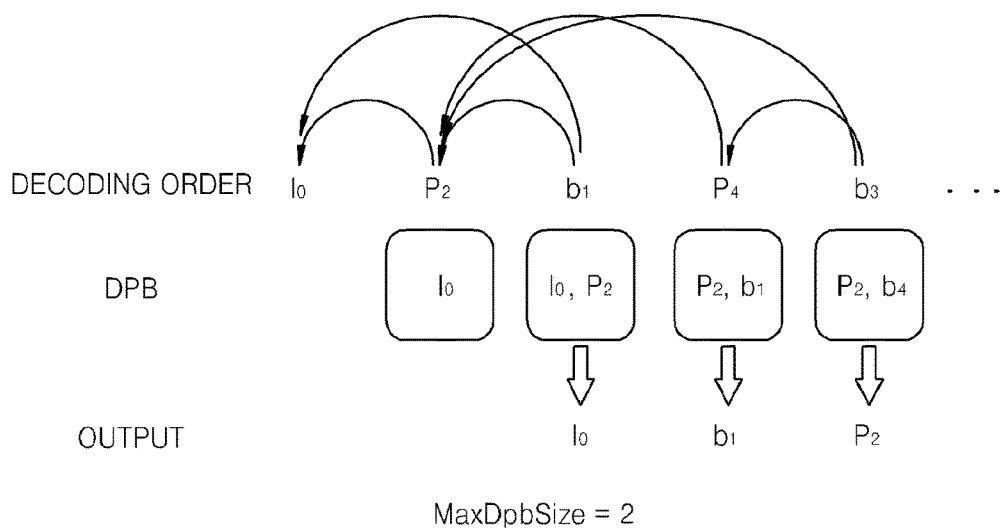

FIGS. 16A and 16B are reference diagrams for describing maximum size information of a DPB required according to a decoding order during an encoding process of an image sequence.

Referring to FIG. 16A, it is assumed that an encoder performs encoding in an order of I0, P1, P2, P3, and P4, and the encoding is performed by referring to pictures in directions indicated by arrows. Like such an encoding order, decoding is performed in an order of I0, P1, P2, P3, and P4. In FIG. 16A, since a picture refers to one reference picture that is immediately pre-decoded, a maximum size of a DPB required to normally decode an image sequence is 1.

Referring to FIG. 16B, it is assumed that an encoder performs encoding in an order of I0, P2, b1, P4, and b3 by referring to pictures in directions indicated by arrows. Since a decoding order is the same as the encoding order, decoding is performed in an order of I0, P2, b1, P4, and b3. In an image sequence of FIG. 16B, since a P picture refers to an I picture that is pre-decoded or one reference picture of the P picture, and a b picture refers to the I picture that is pre-decoded or two reference pictures of the P picture, a maximum size of a DPB required to normally decode the image sequence is 2. Despite that the maximum size of the DPB required to normally decode the image sequence has a small value of 1 or 2 as shown in FIGS. 16A and 16B, if information about the maximum size of the DPB is not separately transmitted, the decoder has to use information about a maximum size of a DPB pre-determined according to profiles and levels of a video codec. If the DPB of the decoder has a maximum value of 3, i.e., is able to store 3 decoded image frames maximum, and a maximum size of the DPB is set to be 13 according to Table 3 as a value pre-determined according to a profile or a level of a video codec, despite that the DPB has a sufficient size to decode an encoded image frame, the size of the DPB is smaller than the pre-determined maximum size of the DPB, and thus the decoder may wrongly determine that the encoded image frame cannot be decoded.

Accordingly, the video encoding apparatus 100 according to an exemplary embodiment determines a max_dec_frame_buffering syntax indicating a maximum size of a DPB required to decode each image frame by a decoder, based on an encoding order (or a decoding order) of image frames that form an image sequence and an encoding order (or a decoding order) of reference frames referred to by the image frames, and inserts and transmits the max_dec_frame_buffering syntax to and with an SPS corresponding to header information of the image sequence. The video encoding apparatus 100 includes the max_dec_frame_buffering syntax in the SPS as mandatory information instead of selective information.

Meanwhile, when a decoded picture is stored in the DPB of the decoder in a general video codec and a new space is required to store the decoded picture, a reference picture having a lowest display order (picture order count) is output from the DPB via bumping so as to obtain an empty space for storing a new reference picture. In the general video codec, the decoder is able to display the decoded picture only when the decoded picture is output from the DPB via such a bumping process. However, when the decoded picture is displayed through the bumping process as such, output of a pre-decoded reference picture is delayed until the bumping process.

Figure 17:
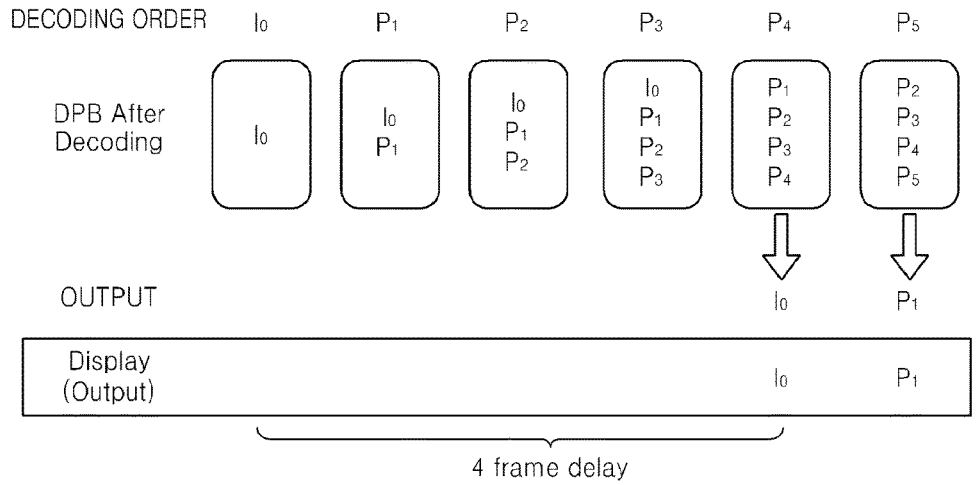
FIG. 17 is a diagram illustrating a process of outputting a decoded picture from a DPB according to a bumping process in a video codec field related to an exemplary embodiment.

FIG. 17 is a diagram illustrating a process of outputting a decoded picture from a DPB according to a bumping process in a video codec field related to an exemplary embodiment. In FIG. 17, it is assumed that a maximum size (MaxDpbSize) of the DPB is 4, i.e., the DPB may store four decoded pictures maximum.

Referring to FIG. 17, in a general video codec field, if a P4 frame decoded 4 frames after an I0 picture is to be stored in a DPB despite that the I0 picture is first decoded according to a decoding order, the I0 picture may be output from the DPB and displayed via a bumping process. Accordingly, the I0 picture is output after being delayed 4 frames from a decoding time.

Accordingly, the video decoding apparatus 200 according to an exemplary embodiment quickly outputs a decoded picture from a DPB without a bumping process by setting a predetermined latency parameter from a moment each decoded picture is stored in the DPB by using a MaxLatencyFrames syntax indicating a maximum number of image frames preceding a predetermined frame in an image sequence based on a display order but behind the predetermined frame based on a decoding order, increasing a count of the latency parameter of the decoded picture stored in the DPB by 1 whenever each picture in the image sequence is decoded according to the decoding order, and outputting a decoded picture whose count of the latency parameter has reached the MaxLatencyFrames syntax from the DPB. In other words, the video decoding apparatus 200 initially assigns 0 as a latency parameter to a decoded picture stored in a DPB when the decoded picture is stored in the DPB, and increases the latency parameter by 1 whenever a following picture is decoded one-by-one according to a decoding order. Also, the video decoding apparatus 200 compares the latency parameter with the MaxLatencyFrames syntax to output a decoded picture whose latency parameter has the same value as the MaxLatencyFrames syntax from the DPB.

For example, when the MaxLatencyFrames syntax is n, wherein n is an integer, a decoded picture first decoded based on the decoding order and stored in the DPB is assigned with 0 for a latency parameter. Then, the latency parameter of the first decoded picture is increased by 1 whenever following pictures are decoded according to the decoding order, and the first decoded and stored picture is output from the DPB when the latency parameter reaches n, i.e., after a picture encoded (n)th based on the decoding order is decoded.

Figure 18:
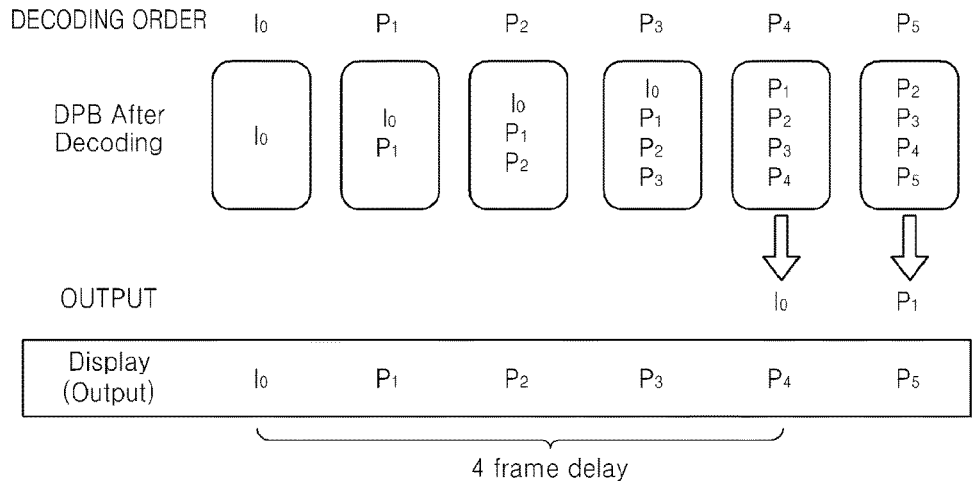
FIG. 18 is a diagram for describing a process of outputting a decoded picture from a DPB by using a MaxLatency-Frames syntax, according to an exemplary embodiment.

FIG. 18 is a diagram for describing a process of outputting a decoded picture from a DPB by using a MaxLatencyFrames syntax, according to an exemplary embodiment. In FIG. 18, it is assumed that a maximum size (MaxDpbSize) of the DPB is 4, i.e., the DPB is able to store 4 decoded pictures maximum, and the MaxLatencyFrames syntax is 0.

Referring to FIG. 18, since the MaxLatencyFrames syntax has a value of 0, the video decoding apparatus 200 may immediately output a decoded picture. In FIG. 18, the MaxLatencyFrames syntax has the value of 0 in an extreme case, but if the MaxLatencyFrames syntax has a value smaller than 4, a point of time when the decoded picture is output from the DPB may move up compared to when the decoded picture is output from the DPB after being delayed 4 frames from a decoding time via a bumping process.

Meanwhile, an output time of the decoded picture may move up as the MaxLatencyFrames syntax has a smaller value, but since the decoded picture stored in the DPB should be displayed according to a display order identical to that determined by an encoder, the decoded picture should not be output from the DPB until its display order is reached even if the decoded picture is pre-decoded.

Accordingly, the video encoding apparatus 100 determines a MaxLatencyFrames syntax indicating a maximum latency frame based on a maximum value of a difference between an encoding order and a display order of each image frame while encoding each of image frames that form an image sequence, inserts the MaxLatencyFrames syntax into a mandatory component of an SPS, and transmits the MaxLatencyFrames syntax to the image decoding apparatus 200.

Alternatively, the video encoding apparatus 100 may insert a syntax for determining the MaxLatencyFrames syntax, and a syntax indicating the number of image frames required to be reordered into the SPS instead of directly inserting the MaxLatencyFrames syntax into the SPS. In detail, the video encoding apparatus 100 may determine a num_reorder_frames syntax indicating a maximum number of image frames required to be reordered as the image frames are first encoded based on an encoding order from among image frames that form an image sequence but are displayed after post-encoded image frames based on a display order, and insert a difference value between the MaxLatencyFrames syntax and the num_reorder_frames syntax, i.e., a value of MaxLatencyFrames syntax−num_reorder_frames syntax, into the SPS instead of a max_latency_increase syntax for determining the MaxLatencyFrames syntax. When the num_reorder_frames syntax and the max_latency_increase syntax are inserted into and transmitted with the SPS instead of the MaxLatencyFrames syntax, the video decoding apparatus 200 may determine the MaxLatencyFrames syntax by using the value of (num_reorder_frames+max_latency_increase).

FIGS. 19A through 19D are diagrams for describing a MaxLatencyFrames syntax and a num_reorder_frames syntax, according to exemplary embodiments. In FIGS. 19A through 19D, a POC denotes a display order, and an encoding order and a decoding order of image frames that form an image sequence in an encoder and a decoder are the same. Also, arrows above pictures F0 through F9 in the image sequence indicate reference pictures.

Figure 19A:
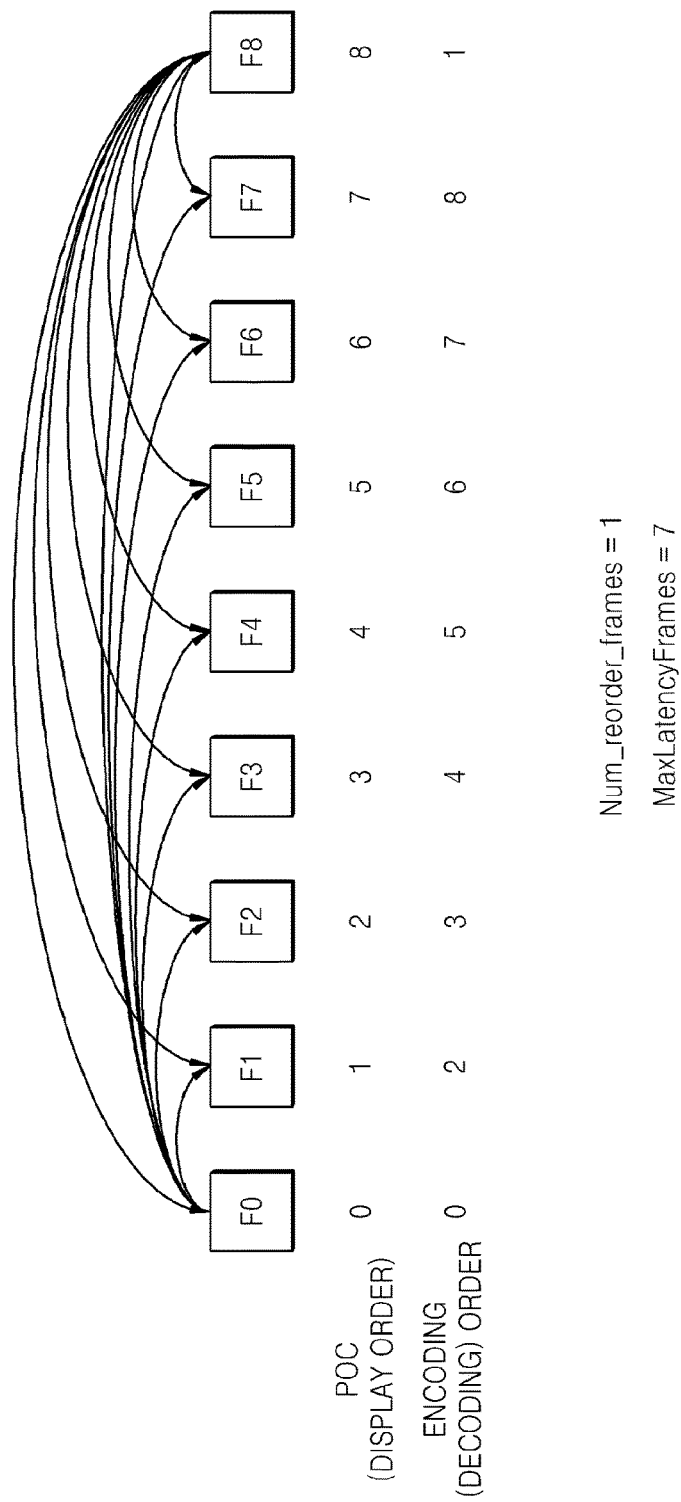

Referring to FIG. 19A, the picture F8 that is the last on the display order and encoded second on the encoding order is a picture having a largest difference value between the display order and the encoding order. Also, the picture F8 is required to be reordered since the picture F8 is encoded before the pictures F1 through F7 but behind the pictures F2 through F7 on the display order. Thus, the num_reorder_frames syntax corresponding to the image sequence shown in FIG. 19A is 1. The video encoding apparatus 100 may set 7 that is the difference value between the display order and the encoding order of the picture F8 as a value of a MaxLatencyFrames syntax, insert the value of the MaxLatencyFrames syntax as a mandatory component of an SPS, and transmit the value of the MaxLatencyFrames syntax to the video decoding apparatus 200. Alternatively, the video encoding apparatus 100 may set 7 that is a difference value between 8 that is a value of a MaxLatencyFrames syntax and 1 that is a value of a num_reorder_frames syntax, as a value of a max_latency_increase syntax, insert the num_reorder_frames syntax and the max_latency_increase syntax as mandatory components of an SPS instead of the MaxLatencyFrames syntax, and transmit the num_reorder_frames syntax and the max_latency_increase syntax to the video decoding apparatus 200.

The video decoding apparatus 200 may add the num_reorder_frames syntax and the max_latency_increase syntax transmitted with the SPS to determine the MaxLatencyFrames syntax, and determine an output time of a decoded picture stored in the DPB by using the MaxLatencyFrames syntax without any bumping process.

Figure 19B:
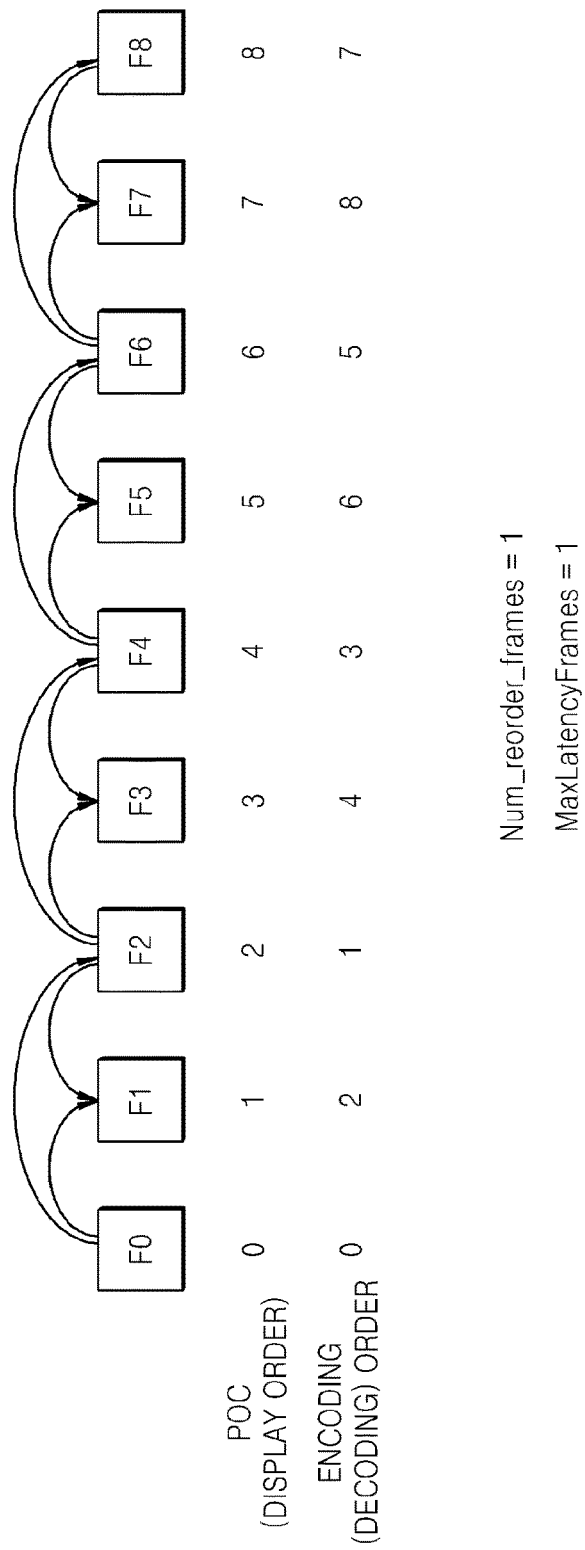

In an image sequence of FIG. 19B, differences between a display order and an encoding order of all pictures excluding a picture F0 are 1. Pictures F2, F4, F6, and F8 are pictures that have a slow encoding order but have a fast display order from among pictures of the image sequence of FIG. 19B, and thus are required to be reordered. There is only one picture that has a slow encoding order but has a fast display order based on each of the pictures F2, F4, F6, and F8. For example, there is only the picture F1 that has a slower encoding order but has a faster display order than the picture F2. Accordingly, a value of a num_reorder_frames syntax of the image sequence of FIG. 19B is 1. The video encoding apparatus 100 may set 1 as a value of a MaxLatencyFrames syntax, insert the value of the MaxLatencyFrames syntax as a mandatory component of an SPS, and transmit the value of the MaxLatencyFrames syntax to the video decoding apparatus 200. Alternatively, the video encoding apparatus 100 may set 0 that is a difference value between 1 that is a value of the MaxLatencyFrames syntax and 1 that is a value of the num_reorder_frames syntax, as a value of a max_latency_increase syntax, insert the num_reorder_frame syntax and the max_latency_increase syntax as mandatory components of the SPS instead of the MaxLatencyFrames syntax, and transmit the num_reorder_frame syntax and the max_latency_increase syntax to the video decoding apparatus 200.

The video decoding apparatus 200 may add the num_reorder_frames syntax and the max_latency_increase syntax transmitted with the SPS to determine the MaxLatencyFrames syntax, and determine an output time of a decoded picture stored in the DPB by using the MaxLatencyFrames syntax without any bumping process.

Figure 19C:
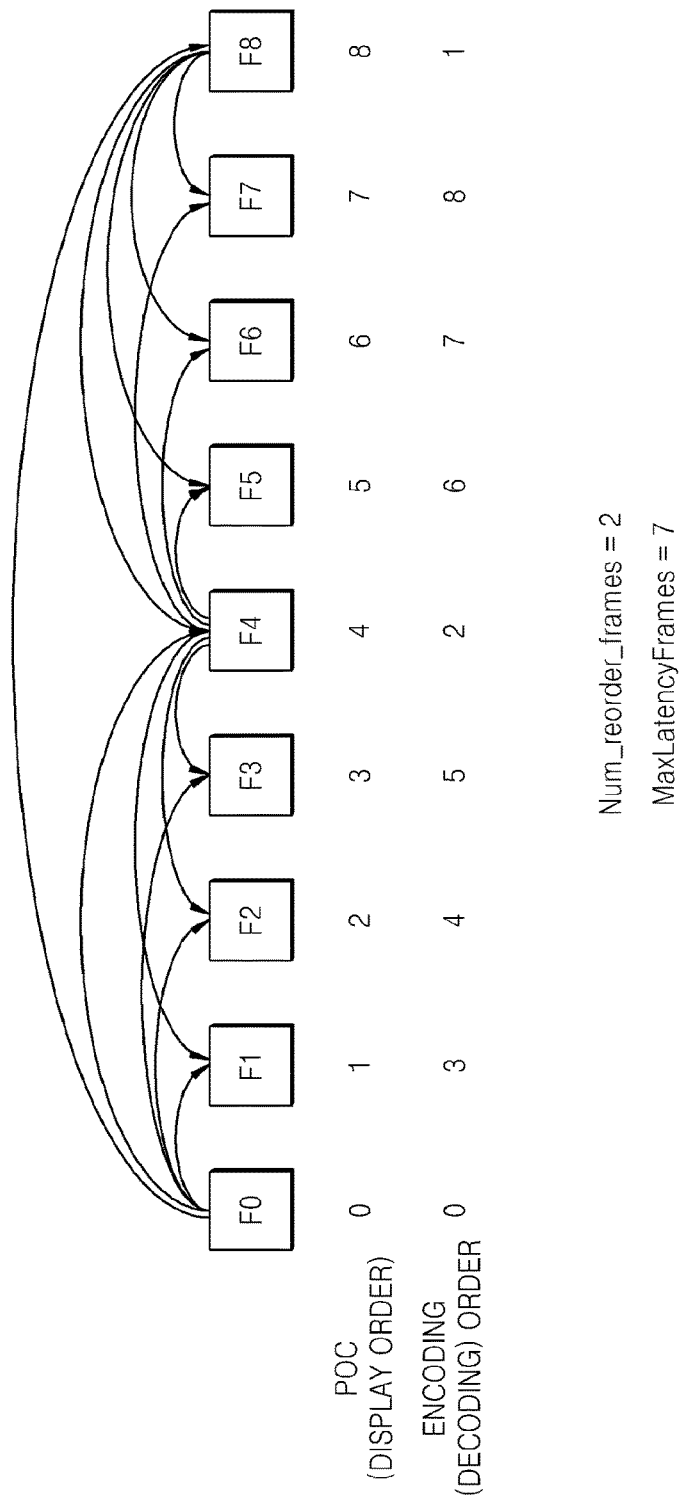

In an image sequence of FIG. 19C, a picture F8 that is the last on a display order and encoded second on an encoding order has a largest difference value of 7 between the display order and the encoding order. Accordingly, a MaxLatencyFrames syntax is 7. Also, pictures F4 and F8 are required to be reordered since the pictures F4 and F8 are encoded and stored in the DPB before pictures F1 through F3 based on the decoding order but are displayed later than the pictures F1 through F3 based on the display order, and thus a value of a num_reorder_frames syntax is 2. The video encoding apparatus 100 may set 7 as the value of the MaxLatencyFrames syntax, insert the value of the MaxLatencyFrames syntax as a mandatory component of an SPS, and transmit the value of the MaxLatencyFrames syntax to the video decoding apparatus 200. Alternatively, the video encoding apparatus 100 may set 5 that is a difference value between 7 that is the value of the MaxLatencyFrames syntax and 2 that is the value of the num_reorder_frames syntax, as a value of a max_latency_increase syntax, insert the num_reorder_frames syntax and the max_latency_increase syntax as mandatory components of the SPS instead of the MaxLatencyFrames, and transmit the num_reorder_frames syntax and the max_latency_increase syntax to the video decoding apparatus 200.

The video decoding apparatus 200 may add the num_reorder_frames syntax and the max_latency_increase syntax transmitted with the SPS to determine the MaxLatencyFrames syntax, and determine an output time of a decoded picture stored in the DPB by using the MaxLatencyFrames syntax without any bumping process.

In an image sequence of FIG. 19D, pictures F4 and F8 have a maximum value of 3 of a difference value between a display order and an encoding order. Accordingly, a value of a MaxLatencyFrames syntax is 3. Also, pictures F2 and F4 are required to be reordered since the pictures F2 and F4 are encoded before a picture F1 but are displayed later than the picture F1 based on the display order. Also, pictures F6 and F8 are required to be reordered since the pictures F6 and F8 are encoded before a picture F5 and are displayed later than the picture F5 based on the display order. Thus a value of a num_reorder_frames syntax is 2. The video encoding apparatus 100 may set 3 as the value of the MaxLatencyFrames syntax, insert the value of the MaxLatencyFrames syntax as a mandatory component of an SPS, and transmit the value of the MaxLatencyFrames syntax to the video decoding apparatus 200. Alternatively, the video encoding apparatus 100 may set 1 that is a difference value between 3 that is the value of the MaxLatencyFrames syntax and 2 that is the value of the num_reorder_frames syntax, as a value of a max_latency_increase syntax, insert the num_reorder_frames syntax and the max_latency_increase syntax as mandatory components of the SPS instead of the MaxLatency-Frames, and transmit the num_reorder_frames syntax and the max_latency_increase syntax to the video decoding apparatus 200.

The video decoding apparatus 200 may add the num_reorder_frames syntax and the max_latency_increase syntax transmitted with the SPS to determine the MaxLatencyFrames syntax, and determine an output time of a decoded picture stored in the DPB by using the MaxLatencyFrames syntax without any bumping process.

FIG. 20 is a flowchart illustrating an image encoding method according to an exemplary embodiment.

Referring to FIG. 20, in operation 2010, the maximum coding unit splitter 110 and the coding unit determiner 120 (hereinafter, commonly called an encoder), which perform encoding in a VCL of the video encoding apparatus 100, determine a reference frame of each of image frames that form an image sequence by performing motion prediction and compensation, and encode each image frame by using the determined reference frame.

In operation 2020, the output unit 130 determines a maximum size of a buffer required to decode each image frame by a decoder, and the number of image frames required to be reordered, based on an encoding order of image frames, an encoding order of reference frames referred to by the image frames, a display order of the image frames, and a display order of the reference frames. In detail, the output unit 130 determines a max_dec_frame_buffering syntax indicating a maximum size of a DPB required to decode each image frame by a decoder based on an encoding order (or a decoding order) of image frames and an encoding order (or a decoding order) of reference frames referred to by the image frames, inserts the max_dec_frame_buffering syntax into an SPS corresponding to header information of an image sequence, and transmits the max_dec_frame_buffering syntax to an encoder. As described above, the output unit 130 includes the max_dec_frame_buffering syntax in the SPS as mandatory information instead of selective information.

In operation 2030, the output unit 130 determines latency information of an image frame having a largest difference between an encoding order and a display order from among the image frames that form the image sequence, based on the number of image frames required to be reordered. In detail, the output unit 130 determines a MaxLatencyFrames syntax based on a maximum value of a difference between an encoding order and a display order of each image frame while encoding the image frames that form the image sequence. Also, the output unit 130 may determine a num_reorder_frames syntax indicating a maximum number of image frames that are first encoded according to an encoding order based on a predetermined image frame from among the image frames of the image sequence and displayed after a post-encoded image frame based on a display order, and thus required to be reordered, and insert a difference value between the MaxLatencyFrames syntax and the num_reorder_frames syntax, i.e., a value of MaxLatencyFrames syntax−num_reorder_frames, into an SPS as a max_latency_increase syntax for determining the MaxLatencyFrames syntax. If the num_reorder_frames syntax and the max_latency_increase syntax indicating the value of MaxLatencyFrames syntax−num_reorder_frames syntax are included in and transmitted with the SPS, instead of the MaxLatencyFrames syntax, the video decoding apparatus 200 may determine the MaxLatencyFrames syntax by using the value of MaxLatencyFrames syntax−num_reorder_frames syntax.

In operation 2040, the output unit 130 generates a bitstream by including the max_dec_frame_buffering syntax, the num_reorder_frames syntax, and the max_latency_increase syntax as mandatory components of the SPS.

FIG. 21 is a flowchart illustrating an image decoding method according to an exemplary embodiment.

Referring to FIG. 21, in operation 2110, the image data and encoding information extractor 220 obtains an NAL unit of an NAL from a bitstream, and obtains a max_dec_frame_buffering syntax indicating a maximum size of a buffer, a num_reorder_frames syntax indicating the number of image frames required to be reordered, and a max_latency_increase syntax for determining a MaxLatencyFrames syntax from the NAL unit including an SPS.

In operation 2120, the DPB included in the image data decoder 230 sets the maximum size of the buffer required to decode the image sequence by using the max_dec_frame_buffering syntax.

In operation 2130, the image data and encoding information extractor 220 obtains encoded data of an image frame included in a VCL NAL unit, and outputs the obtained encoded data to the image data decoder 230. The image data decoder 230 obtains a decoded image frame by decoding the encoded image data.

In operation 2140, the DPB of the image data decoder 230 stores the decoded image frame.

In operation 2150, the DPB determines whether to output the stored decoded image frame by using the num_reorder_frames syntax and the max_latency_increase syntax. In detail, the DPB determines the MaxLatencyFrames syntax by adding the num_reorder_frames syntax and the max_latency_increase syntax. The DPB sets a predetermined latency parameter for each decoded and stored image frame, increases a count of the predetermined latency parameter by 1 whenever an image frame of the image sequence is decoded according to a decoding order, and outputs the decoded image frame whose count of the predetermined latency parameter reached the MaxLatencyFrames syntax.

One or more exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While exemplary embodiments have been particularly shown and described above, it will be understood by those of ordinary skill in the art that various changes in form and details may be made therein without departing from the spirit and scope of the invention as defined by the appended claims. Exemplary embodiments should be considered in a descriptive sense only and not for purposes of limitation. Therefore, the scope of the invention is defined not by the detailed description of exemplary embodiments but by the appended claims, and all differences within the scope will be construed as being included in the present invention.

The invention claimed is:

1. An apparatus of decoding an image, the apparatus comprising:
   an image data and encoding information extractor for obtaining a first syntax indicating a maximum size of a buffer required to decode picture included in an image sequence, a second syntax indicating maximum number of pictures that can precede any first picture in the image sequence in decoding order and follow the any first picture in display order, the pictures being required to be reordered, and a third syntax used to obtain latency information indicating maximum number of pictures that can precede any second picture in the image sequence in the output order and follow the any second picture in decoding order, from a bitstream;
   a decoder for decoding the bitstream; and
   a buffer for storing the decoded image frames,
   wherein the decoder determines a maximum size of a buffer storing decoded picture based on the first syntax, and determines whether to output the decoded picture stored in the buffer based on the second syntax and the third syntax by increasing a latency parameter count of the decoded picture stored in the buffer by a predetermined value when a picture include in the image sequence is decoded and outputs the decoded picture from the buffer when the latency parameter count of the decoded picture is equal to the latency information, and
   wherein the first syntax, the second syntax, and the third syntax are included in a sequence parameter set.

* * * * *